United States Patent [19]

Reasenberg et al.

[11] Patent Number: 5,412,474

[45] Date of Patent: May 2, 1995

[54] SYSTEM FOR MEASURING DISTANCE BETWEEN TWO POINTS USING A VARIABLE FREQUENCY COHERENT SOURCE

[75] Inventors: Robert D. Reasenberg; James D. Phillips, both of Lexington; Martin C. Noecker, Concord, all of Mass.

[73] Assignee: Smithsonian Institution, Washington, D.C.

[21] Appl. No.: 880,590

[22] Filed: May 8, 1992

[51] Int. Cl.$^6$ .............................................. G01B 9/02
[52] U.S. Cl. ................... 356/349; 356/345; 356/352; 356/4.09
[58] Field of Search ............... 356/4.5, 345, 349, 350, 356/352, 357, 358

[56] References Cited

U.S. PATENT DOCUMENTS

| | | |
|---|---|---|
| 3,458,259 | 7/1969 | Bagley et al. |
| 3,542,472 | 11/1970 | Smith-Vaniz |
| 3,551,055 | 12/1970 | Chitayat |
| 3,656,853 | 4/1972 | Bagley et al. |
| 3,756,722 | 9/1973 | Wetzel |
| 4,272,193 | 6/1981 | Eastman et al. |
| 4,643,575 | 2/1987 | Hazeltine et al. |
| 4,744,658 | 5/1988 | Holly |
| 4,784,490 | 11/1988 | Wayne |
| 4,815,851 | 3/1989 | Soohoo ......................... 356/350 |
| 5,166,749 | 11/1992 | Curbelo et al. .................. 356/346 |

FOREIGN PATENT DOCUMENTS 0241305  10/1988  Japan ..................... 356/345

OTHER PUBLICATIONS

Applied Optics/vol. 15, No. 3/Mar. 1976, "Laser Wavelength Comparison by High Resolution Interferometer" by Layer et al.
Li-Cor, Inc., Sep. 1, 1985, "The LI-1800 Portable Spectroradiometer", [name(s) of author(s) not provided].
Electronics Letters, Jul. 3, 1986, vol. 22, No. 14, "High Return Loss Connector Design Without Using Fibre Contact or Index Matching", [name(s) of author(s) not provided].
Optics Letters—Optical Society of America, May 1988, vol. 13, No. 5, (pp. 339–341), "Two-wavelength laser interferometry using superheterodyne defection", [R. Dandliker, R. Thalmann, and D. Prongue].
Optical Society of America, Jan. 27, 1988, "Two-wavelength laser interferometry using superheterodyne detection", [R. Dandliker, R. Thalmann, and D. Prongue].
The American Physical Society—Physical Review A, (List continued on next page.)

Primary Examiner—Samuel A. Turner
Assistant Examiner—Robert Kim
Attorney, Agent, or Firm—Oblon, Spivak, McClelland, Maier & Neustadt

[57] ABSTRACT

An interferometric gauge for high precision absolute and incremental measurements of distances of up to at least 100 meters. An accuracy of 0.02 Angstrom has been demonstrated, free of the ~10 Angstrom polarization-leakage errors of conventional gauges. The absolute distance measurement requires no a priori information, and multiple synthetic wavelengths need not be used. The gauge can be used as the sensor for a null servo. There are reduced-cost versions of lower accuracy. The gauge can employ a resonant cavity for greater sensitivity, and can be built with no transmissive elements in the measured path. Without additional hardware, the gauge readout can be in the form of a frequency or an analog electrical signal, in addition to a digital count of an integral number of wavelengths. The gauge employs a high-sensitivity null sensor. Feedback to an optical frequency shifter maintains the null condition; the frequency shift is measured electronically, providing a high sensitivity distance readout. The gauge keeps track of the whole and fractional number of the optical waves travelled. Absolute distance measurement is based on free spectral range determination, employing the high sensitivity and freedom from polarization leakage of this design.

28 Claims, 19 Drawing Sheets

OTHER PUBLICATIONS

Nov. 1984, vol. 30, No. 5, "Laser-frequency division and stabilization", [R. G. DeVoe and R. G. Brewer].

Journal Opt. Soc. Am.B., Sep. 1985, vol. 2, No. 9, (Ultrasensitive Spectroscopy), "Servo control of amplitude modulation in frequency—modulation spectroscopy: demonstration of shot-noise-limited detection", [N. C. Wong and J. L. Hall].

Applied Optics, Sep. 1, 1991, vol. 30, No. 25, (pp. 3612–3616), "Three-color-diode interferometer", [Peter de Groot].

Applied Optics, Mar. 1976, vol. 15, No. 3, (pp. 734–742), "Laser wavelength comparison by high resolution interferometry", [H. P. Layer, R. D. Deslattes and W. G. Schweitzer, Jr.].

The American Physical Society, Mar. 1, 1988, vol. 37, No. 5, (pp. 1802–1805), "Precision optical-frequency-difference", [R. G. DeVoe, C. Fabre, K. Jungmann, J. Hoffnagle and R. G. Brewer].

Submitted at the JPL Workshop on Space Interferometry By: Harvard–Smithsonian Center for Astrophysics, Sep. 15, 1991, Preprint Series, No. 3139, (pp. 1–9), "Progress Report on a Picometer Null-Sensing Distance Gauge", [James Phillips, Robert Reasenberg, and Martin Noecker].

Journal Opt. Society Am.B.—Optical Society of America, Sep. 1985, vol. 2, No 9, (pp. 1527–1533), "Servo control of amplitude modulation in frequency-modulation spectroscopy: demonstration of shot-noise-limited detecting", [N. C. Wong and J. L. Hall].

The American Physical Society—Physical Review A, Nov. 1984, vol. 30, (pp. 2827–2829), "Laser-frequency division and stabilization", [R. G. DeVoe and R. G. Brewer].

The American Physical Society—Physical Review A, Mar. 1, 1988, vol. 37, No. 5, (pp. 1802–1805), "Precision optical-frequency-difference measurement", [R. G. DeVoe, C. Fabre, K. Jungmann, J. Hoffnagle, and R. G. Brewer].

Applied Optics, Mar. 1976, vol. 15, No. 3, (pp. 734–743), "Laser wavelength comparison by high resolution interferometry", [H. P. Layer, R. D. Deslattes, and W. G. Schweitzer, Jr.].

Physics Letters A 0375-9601/90 Elsevier Science Publishers B.V., Aug. 6, 1990, vol. 148, no. 1.2, (pp. 8–16), "External modulation technique for sensitive interferometric detection of displacements", [C. N. Man, D. Shoemaker, M. Pham Tu and D. Dewey].

J. Guidance and Control AIAA 79–1741R, Mar.–Apr. 1981, vol. 4, No. 2, (pp. 141–147), "Sensing the Position and Vibration of Spacecraft Structures", [R. H. Anderson, C-C. Huang and N. E. Buholz].

SPIE Control and Communication Technology in Laser Systems, vol. 295, (pp. 91–98), "Precision distance measurements in and between satellites", [R. H. Anderson, C. W. Gillard, C-C. Huang, N. E. Buholz].

Applied Optics, Jan. 15, 1979, vol. 18, No. 2, (pp. 225–227), "Absolute distance measurements by $CO^2$ laser multiwavelength interferometry", [G. L. Bourdet and A. G. Orszag].

Applied Optics, Feb. 15, 1986, vol. 16, No. 7, (pp. 1857–1860), "Analytical procedure from determining lengths from fractional fringes", [Charles R. Tilford].

JPL Interoffice Memorandum, Mar. 28, 1989, (pp. 1–3), Appendix Subject: "State of Precision of Absolute Distance Measurement Using Laser Interferometry: A Literature Search", [Sohrab Mobasser].

Applied Optics, Feb. 15, 1986, vol. 25, No. 4, (pp. 493–498), "Snythetic interferometric distance-measuring system using a $CO^2$ laser", [Hirokazu Matsumoto].

Applied Optics, May 1, 1987, vol. 26, No. 9, (pp. 1680–1687), "Measurement of absolute distances of 23 m by multiwavelength $CO^2$ laser interferometry", [C. J. Walsh].

(List continued on next page.)

OTHER PUBLICATIONS

Applied Optics, Jan. 15, 1981, vol. 20, No. 2, (pp. 231–234), "Infrared He–Xe laer interferometry for measuring length", [Hirokazu Matsumoto].

Optical Engineering, May/Jun. 1983, vol. 22, No. 3, (pp. 348–353), "Progress in absolute distance interferometry", [C. W. Gillard and N. E. Buholz].

SPIE Active Optical Devices and Applications, 1980, vol. 228, (pp. 70–77), "Absolute distance interferometry", [G. W. Gillard, N. E. Buholz and D. W. Ridder].

Astrotech 21 Workshops II, vol. 1, (JPLD–8541, vol. 1) (Submitted to The *Proceedings* of JPL Workshop on Space Interferometry Presented by Harvard–Smithsonian Center for Astrophysics), Sep. 15, 1991, Preprint Series, No. 3139, (pp. 1–9), "Progress Report on a Picometer Null-Sensing Gauge", [James Phillips, Robert Reasenberg and Martin Noecker].

Physics Letters A 0375-9601/90, 1990—Elsevier Science Publishers B.V., Aug. 6, 1990, vol. 148, No. 1.2, (pp. 8–16), "External modulation techique for sensitive", [C. N. Man, D. Shoemaker, M. Pham Tu and D. Dewey].

Journal Opt.Soc. Am.B.—Optical Society of America 0740-3224/85/091527, Sep. 1985, vol. 2, No. 9, (pp. 1527–1533), "Servo control of amplitude modulation in frequency–modulation spectroscopy: demonstration of shot–noise–limited detection", [N. C. Wong and J. L. Hall].

Optical Society of America—Optics Letters, Apr. 9, 1990, vol. 13, No. 5, (pp. 339–340), "Two–wavelength laser laser interferometry using superheterodyne detection", [R. Dandlikier, R. Thalmann, and D. Prongue].

Electronics Letters, Jul. 3, 1986, vol. 22, No. 14, (pp. 731–732), "High Return Loss Connector Design Without Using Fibre Contact or Index Matching", [R. Rao and J. S. Cook].

The American Physical Society, Apr. 9, 1990, vol. 64, No. 15, (pp. 1697–1700), "Improved Kennedy–Thorndike Experiment to Test Special", [Dieter Hils & J. L. Hall].

The American Physical Society, Nov. 1984, vol. 30, No. 5, (pp. 2827–2829), "Laser–frequency division division and stabilization", [R. G. DeVoe & R. G. Brewer].

Applied Optics, Aug. 1, 1991, vol. 30, No. 22, (pp. 3133–3138), "Prototype Michelson interferometer with Fabry–Perot cavities", [David Shoemaker, Peter Fritschel, Joseph Giaime, Nelson Christensen and Rainer Weiss].

Hisao Kikuta et al., "Distance measurement by the wavelength shift of laser diode light", Applied Optics, vol. 25, No. 17, Sep. 1, 1986.

Brendon D. Perkins et al., "Laser Diode Based Ranging Through Interferometric Means", Nov. 17, 1992.

Richard Kay, "Laser Metrology Development", Nov. 17, 1992.

Optical Hyper System, "The world-wide standard from the proven leader in Tunable LD Technology", SANTEC Photonic Laboratories.

Science Citation Index (Jan. 1992–Jun. 1992).

Toshihiro Kubota et al., "Interferometer for measuring displacement and distance", Optical Society of America, pp. 310–312, 1987.

Masakazu Suematsu et al., "Wavelength–shift interferometry for distance measurement using the Fourier transform technique for fringe analysis", Applied Optics, vol. 30, No. 28, Oct. 1, 1991.

Katuo Seta et al., "Interferometric Absolute Distance Measurement Utilizing A Mode–Jump Region of a Laser Diode", Optics Communications, vol. 77, No. 4, Jul. 1, 1990.

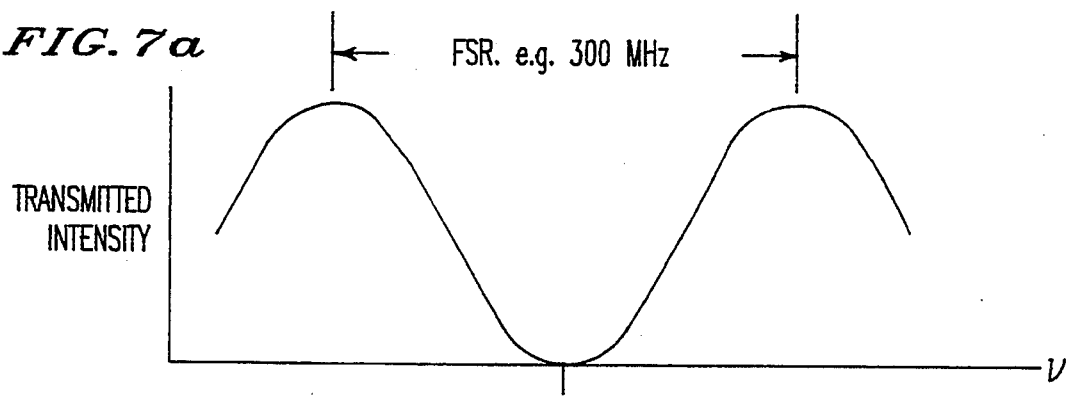
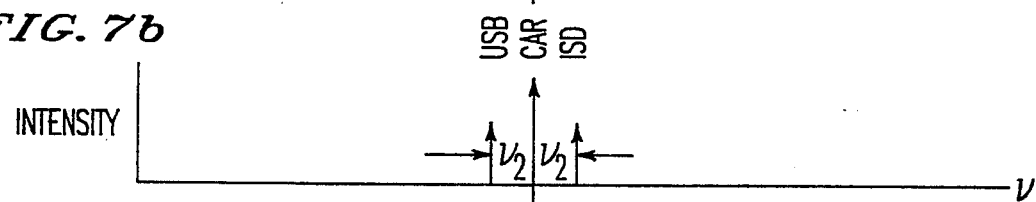
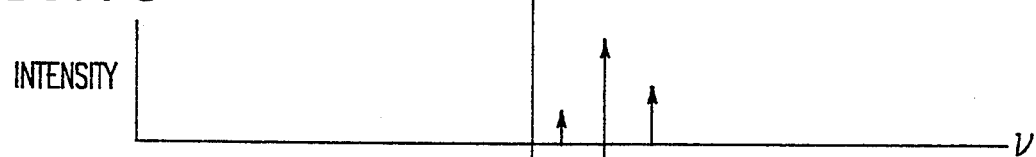
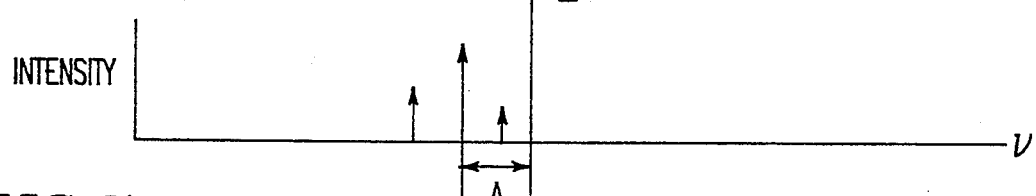
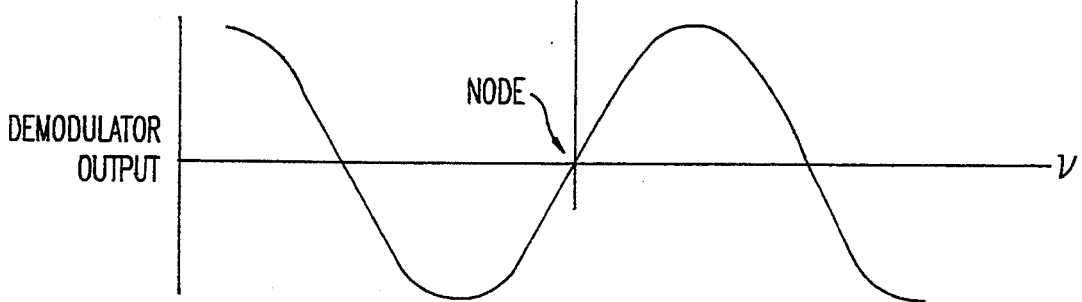

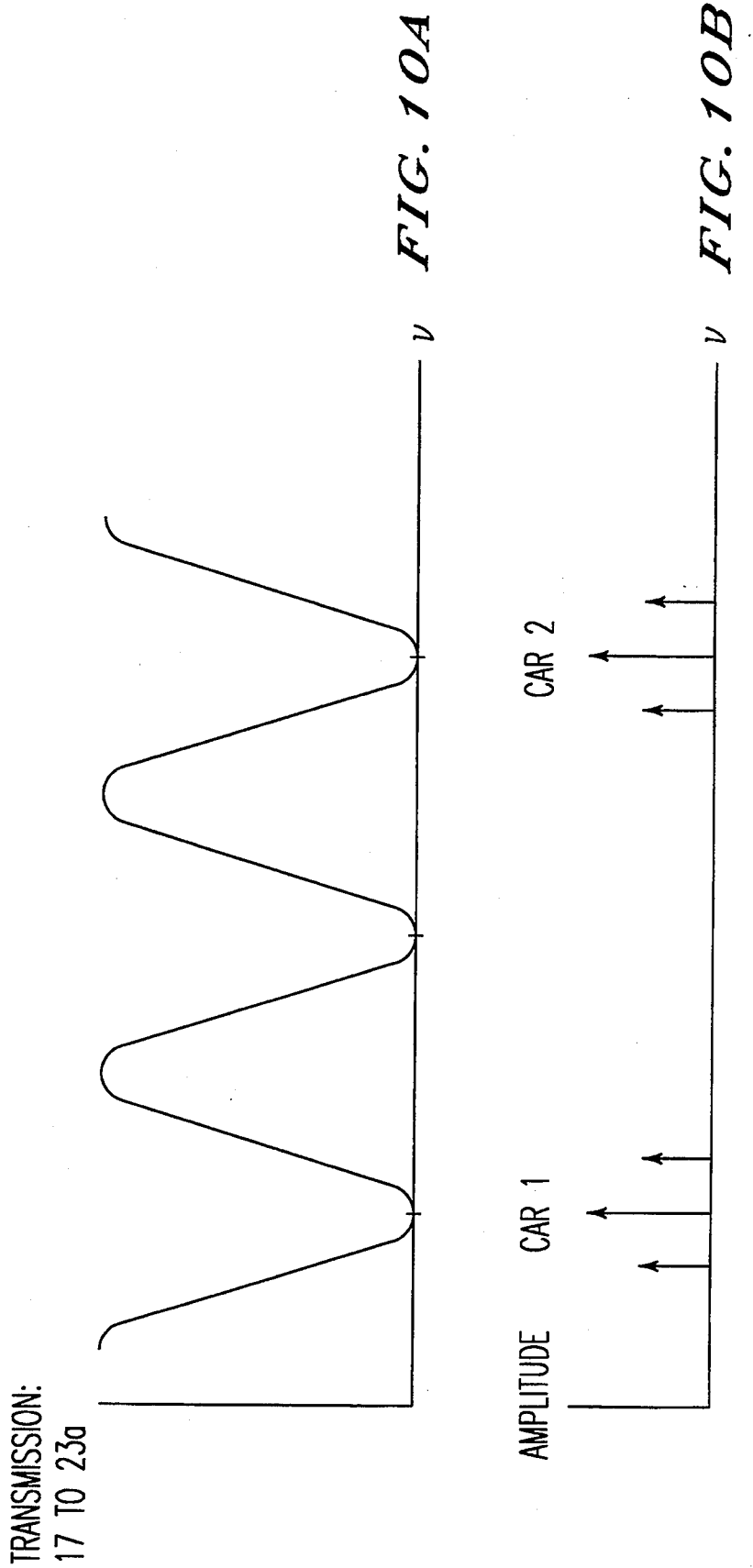

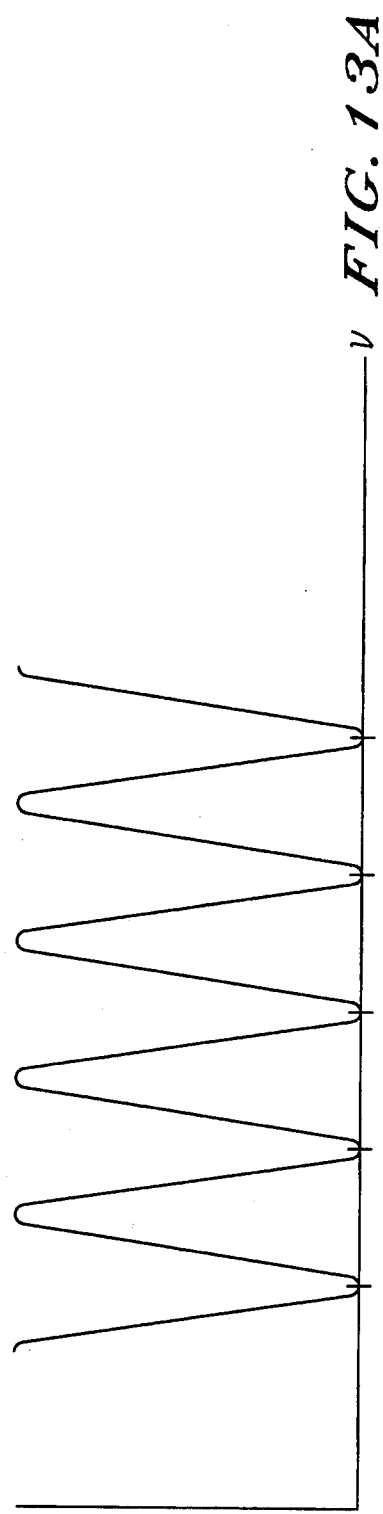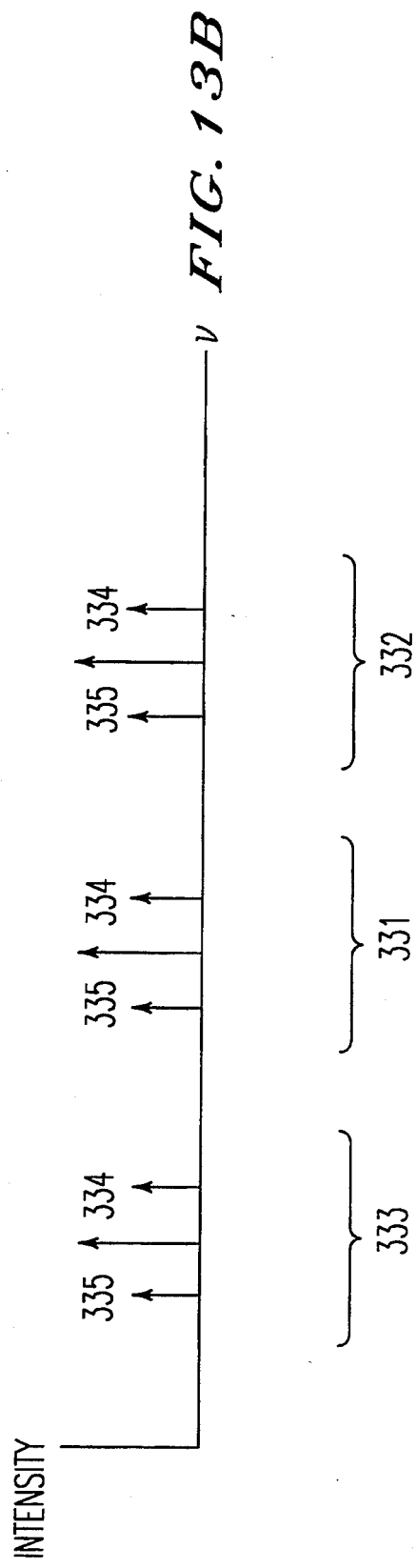

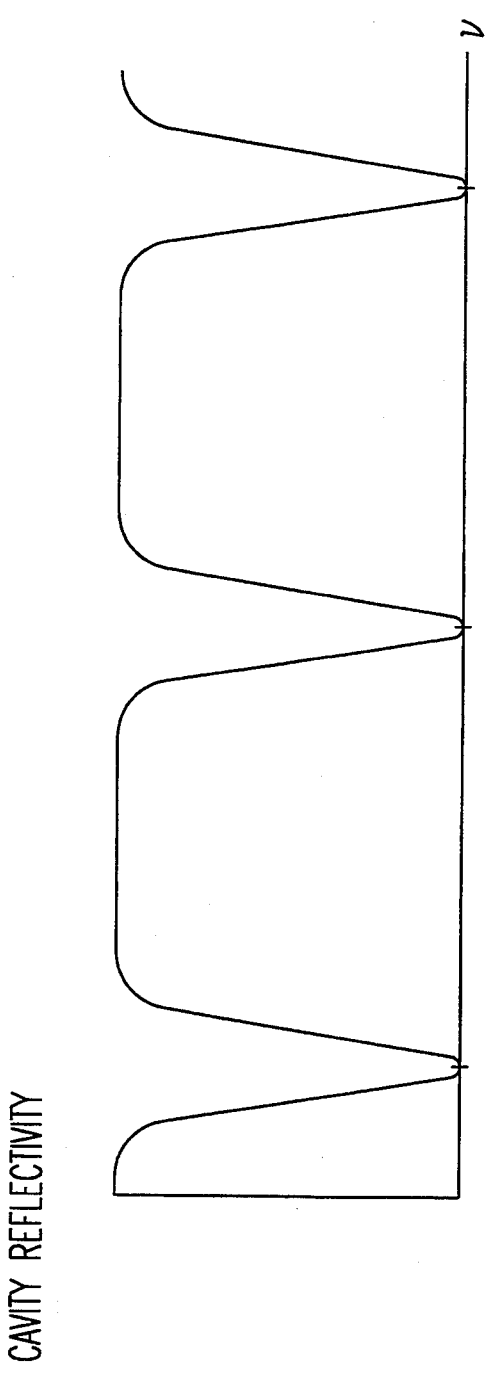
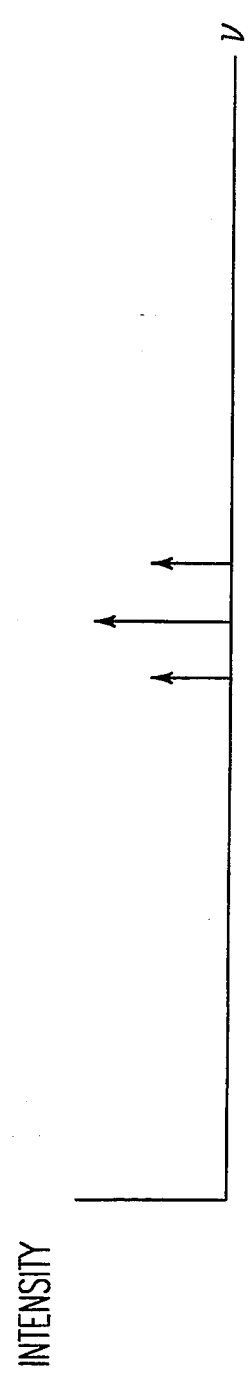
FIG. 15A
FIG. 15B

SYSTEM FOR MEASURING DISTANCE BETWEEN TWO POINTS USING A VARIABLE FREQUENCY COHERENT SOURCE

BACKGROUND OF THE INVENTION

1. Field of the Invention

This invention relates to interferometric distance measuring systems. More particularly, this invention relates to interferometric distance measuring systems for measurement of a change in the distance from one point to another point, the absolute distance from one point to another point, or for control of such distances. It also relates to interferometric distance measuring systems for measurement of a change in the difference between the distances from one point to each of two other points, the difference between the absolute distances from one point to each of two other points, for control of such distance differences, or to systems for combinations of these functions.

DISCUSSION OF THE BACKGROUND

The market for high precision distance measuring gauges is derived from laboratory and commercial uses. These uses are all terrestrially based. Furthermore, all current interferometric gauges have been designed for use in a gaseous atmosphere (e.g, air). Due to unavoidable turbulence that occurs in air, the index of refraction of air varies from point to point and is a function of time. The variation in the index of refraction of air limits to approximately 10 nanometers the accuracy of devices which measure optical path length in air except for those that make corrections by extraordinary means.

Since ordinary interferometric devices operating in air cannot provide a distance measurement whose uncertainty is less than the uncertainty caused by air fluctuations, there has been little incentive to reduce the other uncertainties in such measurements to levels which are well below the uncertainties provided by the air fluctuations.

High quality commercial laser interferometers are used routinely to measure distances to an accuracy on the order of 100 nanometers over distances of up to several meters. These instruments typically do not measure the absolute distance between the two points, but instead measure only a distance change which occurs after the start of a measurement operation. We call instruments which measure a distance change incremental gauges.

There are some optically-based absolute distance measuring devices available. However, these devices are large and extremely complex. Furthermore, these devices require a relatively accurate prior knowledge of the distance to be measured (within 1 percent of the actual distance in some cases). Therefore, these devices have found only limited application.

Another device of interest is an interferometric null servo, which maintains a fixed distance between two points. In an interferometric null servo, a laser gauge is used to measure approximately the deviation of the controlled distance from one which would yield a null or zero output from the interferometer, e.g., the offset from a minimum in transmission. The measured deviation, in the form of an electrical signal, is filtered, amplified, and applied to an actuator so as to return the distance to that which would yield a null output.

Existing differential distance measuring gauges can be classified in two categories. The first category includes devices which provide a relatively low accuracy measurement limited to approximately 100 nanometers. The second group of devices provide an accuracy which is significantly better than 100 nanometers. Many existing devices fall into the first category.

For example, U.S. Pat. No. 3,756,722 to Wetzel discloses an interferometric measuring system including a phase plate which produces a beam with transversely varying phase, thereby producing sine and cosine signals. The combination of sine and cosine signals is free of the directional ambiguity that exist in a single signal.

Another example of a low precision system is disclosed by U.S. Pat. No. 3,452,472 to Reid Smith-Vaniz in which an AC signal is obtained by mechanically vibrating a reference surface. This device requires a laser having two output frequencies. The difference between the two frequencies is varied by changing the length of the laser cavity. This device provides an absolute distance measurement but cannot track a continuously changing distance. Vibration of the reference surface is only provided to produce a signal with which the measurement is made.

Conventional high accuracy interferometric distance measuring systems use two overlapping beams that differ both in polarization and in frequency. The overlapped beams are separated into first and second polarization beams by a polarization-dependent beam splitter. The first separated beam traverses a length to be measured and is then rejoined with the second beam. However, the polarization separation is imperfect. Therefore, some fraction of each of the first and second beams is always intermixed with, and travels the path intended for, the second and first beams, respectively, leading to measurement errors. These measurement errors principally provide a signal bias that is a periodic function of the measured distance.

For example, U.S. Pat. No. 3,458,259 to Bagley et al and U.S. Pat. No. 3,656,853 also to Bagley et al disclose systems using two frequencies. In the '259 patent, a two frequency single mode laser (Zeeman-split) produces two copropagating beams of different polarization and frequency. Bagleys' patents both require polarization separating components. The limitations in the alignment of the polarization directions introduce a cyclic bias in the amplitude of the signal output from the interferometer. The bias corresponds to a systematic error on the order of one nanometer.

In the article by de Groot, in Applied Optics, Vol. 30, No. 25, dated Sep. 1, 1991, an absolute distance gauge design is disclosed which uses a pair of laser diodes. Use of very small laser diodes allows a compact and an inexpensive gauge to be built. In the use of this device, the absolute length must be known a priori to the order of 1 mm because of the limited frequency resolution of the grating used to distinguish between closely-spaced diode laser wavelengths.

SUMMARY OF THE INVENTION

One object of the present invention is to provide a compact and low cost high precision optical distance measurement system.

Another object of the present invention is to provide precise measurement of relative and absolute distances from between 0.01 and 100 meters.

Another object of the present invention is to provide a precise measure of relative and absolute distances between spacecraft.

Another object of the present invention is to provide continuous and/or extremely rapid distance measurements.

Another object of the present invention is to provide for an absolute measurement of distance.

Another object of the present invention is to provide for extremely accurate measurements of distances in vacuum.

Another object of this invention is to provide extremely accurate measurement of distances within satellites and stations in space and between satellites and stations.

Another object of the present invention is to provide a fiber optic coupling system, useful for coupling optical signals into and out of optical fibers, which has extremely low internal reflection.

These objects may be accomplished by a system and a process for using the system for measuring distance between two points, which comprises an interferometer through which a coherent electromagnetic beam passes and a means for varying the frequency of the coherent electromagnetic beam frequency.

These objects may also be accomplished by a system and a process for using the system for measuring distance between two points, which comprises an interferometer through which a coherent electromagnetic beam passes and a means for frequency modulating the coherent electromagnetic beam before passing the beam through the interferometer.

These objects may also be accomplished by a system and a process for using the system for measuring distance between two points which comprises an interferometer which comprises a resonant cavity.

These objects may also be accomplished by a system and a process for using the system for maintaining, at a fixed value, a distance between two points, which comprises an interferometer and means for coupling a coherent electromagnetic beam to said interferometer, wherein said means for coupling comprises a first means for frequency modulating at a first frequency, said coherent electromagnetic beam.

These objects may also be accomplished by a fiberoptic coupler and process of using the coupler, which comprises a single mode optical fiber having at least one end thereof, a surface that is at an angle with respect to the optical axis; and a transparent cap which is joined to the end of the fiber and which has a larger diameter than the fiber core.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 7a–7e show, as a function of optical frequency, signals useful in explaining FM to AM conversion in the present invention;

FIGS. 10a and 10b show, as a function of optical carrier frequency, signals useful in understanding operation of the absolute distance gauge shown in FIGS. 9a–9c;

FIGS. 13a and 13b show, as a function of optical carrier frequency, signals useful in understanding operation of the absolute distance gauge with dual frequency modulation shown in FIG. 12;

FIGS. 15a and 15b show, as a function of optical carrier frequency, signals useful in understanding a resonant cavity interferometer of the present invention;

DESCRIPTION OF THE PREFERRED EMBODIMENTS

Figure 1:
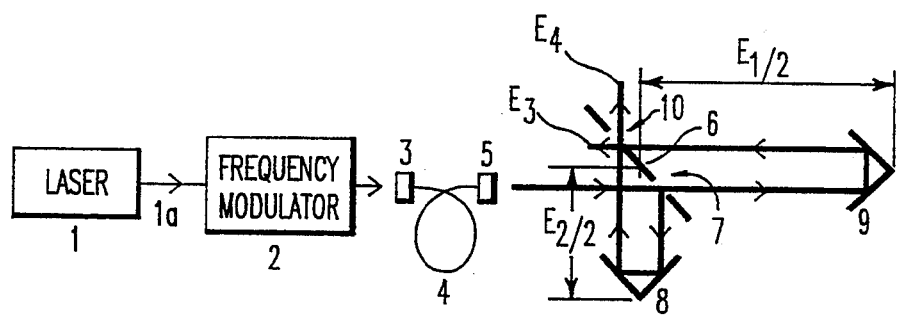
FIG. 1 shows a distance gauge of the present invention.

Referring now to the drawings, wherein like reference numerals designate identical or corresponding parts throughout the several views, and more particularly to FIG. 1 thereof, which shows a beam 1a emitted by laser 1. The function of the laser indicated in FIG. 1 is to provide a coherent optical beam.

Preferably, the laser is of a type which provides a beam of optical waves of a single frequency or very narrow band of frequencies, wherein the frequency or average frequency is stable in time. Instead of a laser beam, any coherent electromagnetic beam may be used, such as any coherent beam with a frequency between radio frequencies and the high end of the ultraviolet light wave frequencies. Such a beam may be provided by a MASER, or a high frequency oscillator such as a Gunn diode, an impact device, a double barrier diode, a crystal oscillator or similar devices.

The beam 1a is frequency modulated by frequency modulator 2. Frequency modulator 2 may be any device which provides a modulation to the frequency of the coherent optical beam.

In particular, the frequency modulator 2 may be an acousto-optic device, an electro-optic device or a magneto-optic device. Furthermore, the frequency modulation represented by frequency modulator 2 may be provided by actually frequency modulating the laser, by modulating properties of the laser material, the cavity or a power source for the laser.

A preferred frequency modulator is an electro-optic modulator cell. Varying an applied voltage to an electro-optic cell varies the index of refraction of the cell, thereby varying the effective optical length of the cell. If the electro-optic cell is driven at a radio frequency, a beam passed therethrough has its phase modulated at the modulation radio frequency due to the voltage-driven variation in optical path length. The phase modulation of the beam after passing through the electro-optic cell is equivalent to frequency modulation of the beam, as will be discussed in more detail below. The modulation depth is proportional to the peak of the radio frequency voltage applied to the cell. A good review of the mathematics of frequency modulation is provided in the book, "REFERENCE DATA FOR RADIO ENGINEERS", sixth edition, Library of Congress card number 75-28960, in Chapter 23.

In all of the embodiments described herein, it is preferable to transport the beam from the modulator or modulators to the interferometer by passing it through a single mode optical fiber. In this case it is also preferable to use a polarization-preserving fiber; this allows better control of the polarization of the light emerging from the fiber. The use of such an optical fiber allows precise, stable alignment of beams injected into the interferometer without rigid mechanical connections which might transmit vibrations; produces a beam at the entrance to the interferometer which has a simple, smooth profile and stable position and orientation which are independent of the alignment of beams between the laser source and the fiber input coupler; and affords the convenience of transporting the beam through a narrow flexible waveguide over distances which may be large. The use of an optical fiber also risks introducing errors associated with polarization changes, variations in transmission due to variations in beam alignment at the fiber input, and spectral modification of the light due to weak interferometric effects within the fiber.

If an optical fiber is used, it may advantageously be inserted between the frequency modulator 2 and the interferometer. In this case, the beam leaving the frequency modulator 2 is coupled to the optical fiber 4 through input coupler 3; this input coupler tightly focussed the beam onto the tiny core of the fiber. The beam is transmitted through the optical fiber and exits through the output coupler 5; this output coupler captures the beam diverging from the end of the fiber and focussed it into a beam which is suitable collimated for injection into the interferometer.

If an optical fiber is not used, it may be advantageous to transport the beam from the frequency modulator 2 to the interferometer using some combination of mirrors and lenses so that the alignment and focussing of the beam may be adjusted easily.

The beam output from the output coupler 5 enters an interferometer, which may be a two-beam interferometer with dihedral or cornercube retro reflectors as shown by the example in FIG. 1; this common type of interferometer is closely related to the Michelson interferometer, which uses flat mirrors instead of dihedrals or cornercubes. The interferometer includes retroreflectors 8 and 9 and partial reflector 6. The entering beam intersects partial reflector 6 at position 7 where the beam is split into two components denoted $E_1$ and $E_2$. The first component $E_1$ propagates toward retroreflector 9 which returns the first component $E_1$ to partial reflector 6 at position 10. Similarly the second component $E_2$ propagates toward retroreflector 8 and is returned to the partial reflector 6 at position 10.

The distance which second component $E_2$ travels from partial reflector 6 to retroreflector 8 and back to partial reflector 6 is denoted by L2. The distance which first portion $E_1$ travels from partial reflector 6 to retroreflector 9 and back to partial reflector 6 is denoted by L1.

The beams $E_1$ and $E_2$ are each split into two components again when they return to partial reflector 6 at position 10; the first component of beam $E_1$ overlaps and combines with the first component of beam $E_2$ to form beam $E_3$, and the second components of each beam similarly combine to form beam $E_4$. Note that as the retroreflector 9 is moved, the length L1 is changed by twice as much distance, since it includes the distances to and from the retroreflector 9. Similarly, the rate of change of L1 is twice the rate of change of the distance between retroreflector 9 and partial reflector 6. The two output beams $E_3$ and $E_4$ contain useful information regarding the difference of the lengths of the interferometer arms, as discussed below.

The interferometer converts the frequency modulation of the optical carrier beam to an amplitude modulation as will now be described with reference to FIGS. 7a–7d. As with all two-beam interferometers, the interferometer shown in FIG. 1 provides an output 10 whose intensity varies sinusoidally with the difference between the optical path lengths in the two arms. In particular, the intensities of beams $E_3$ and $E_4$ vary as $$I_3 = I_0[1 - \cos(2\pi L/\lambda)]/2 \qquad \text{(Equation 1)}$$

$$I_4 = I_0[1 + \cos(2\pi L/\lambda)]/2 \qquad \text{(Equation 2)}$$

where $L = L1 - L2$. As the path difference L changes by one optical wavelength, the intensities vary through one complete cycle, returning to the same values. The arguments of the cosine function in Equations 1 and 2 may be written $$\frac{2\pi L}{\lambda} = \frac{2\pi L \nu}{c} = 2\pi N + \theta \qquad \text{(Equation 3)}$$

Here we have used $\lambda = c/\nu$, where c is the speed of light and $\nu$ is the optical frequency; N is an integer; and $\theta$ is an increment between zero and $2\pi$ to account for a possible non-integer ratio between the path difference L and the wavelength $\lambda$. We may then temporarily consider the integer N to be a fixed constant (which may be very large), and turn our attention to the small increments represented by $\theta$.

From Equation 3 we can see that, in general, the interferometer output intensity varies sinusoidally with both the distance and the optical frequency. It is periodic in L with period $\lambda$; this is the distance change necessary to change N by one. It is periodic in optical frequency with a period equal to the free spectral range, or FSR, given by $$FSR = c/L \qquad \text{(Equation 4)}$$

If the path difference L is small, then the FSR is large, and the interferometer is insensitive to changes in optical frequency. However, if L is thousands of wavelengths or more (large N), then the interferometer output can be a sensitive function of the optical frequency. For small fractional changes in $\nu$ and L, we can write $$\theta = 2\pi\delta(L\nu/c) \qquad \text{(Equation 5)}$$
$$= 2\pi(\delta L/\lambda + \delta\nu/FSR)$$

where $\delta$ denotes a small increment to the indicated quantity. This expression shows that if the path difference is large enough, we may use optical frequency changes and distance changes interchangeably to return the intensity $I_3$ or $I_4$ to some desired value, such as its minimum or maximum. Thus to maintain the interferometer at this target, we may push one endpoint with an actuator to change the path difference L, or we may tune the optical frequency until L is an integer multiple of the new wavelength. Furthermore, if we use both an optical frequency change and a distance actuator, we may control the path difference to follow a target which may be arbitrarily selected by the tuning of the laser.

A null servo may be constructed if a signal may be derived which is zero at the target condition, negative for errors or detuning to one side, and positive for errors or detuning to the other. This signal may then be used in a servo which minimizes the deviation from the target condition. One way to produce such a signal from the interferometer output signals is to measure the difference in the intensities of the output beams $E_3$ and $E_4$; this signal is zero for $\theta = \pm\pi/2$, and changes sign with deviations of $\theta$ near these points. This is a simple method of deriving a signal for the servo, but is more susceptible to drift than the frequency modulation methods which we will describe.

The transmission intensity transmitted to each of the outputs of the interferometer varies sinusoidally as a function of the optical carrier frequency as shown in FIG. 7a. For $L=\frac{1}{2}$ meter, the nodes are separated by about 300 MHz. This is indicated in an exemplary fashion by the 300 MHz in FIG. 7a between two maxima. The so-called orders of the interferometer correspond to the different allowed values of the integer N.

In a spectrometer which measures only the intensity of the coherent optical beam passed through an interferometer, the intensity versus optical frequency corresponds to the graph shown in FIG. 7a.

Frequency or phase modulation of the carrier adds sidebands to the optical signal. The first pair of sideband frequencies are offset from the carrier frequency by the modulation frequency. The modulation frequency may be less than, approximately equal to, or greater than the FSR.

FIG. 7b shows the spectral components of a frequency modulated beam in which the optical carrier frequency CAR is centered at the node shown in FIG. 7a, and the upper sideband USB and lower side band LSB are denoted. The sidebands are separated by a frequency $\nu_2$, the modulation frequency, from the optical carrier.

Phase modulation and frequency modulation are very closely related. The instantaneous frequency is just the rate of accumulation of phase. This rate includes a large constant rate, known as the carrier frequency, and a small varying increment to the rate, which we may describe as either a frequency increment or the rate of change of a phase increment. Because the resulting waves are essentially the same, frequency and phase modulation need not be considered separately.

The modulation depth is defined as the peak phase increment, usually given in radians. For a sinusoidal frequency modulation waveform, the phase varies cosinusoidally, and the modulation depth is equal to the peak deviation of the instantaneous frequency divided by the modulation frequency. The intensity of the sidebands depends on the modulation depth. For small modulation depth, only the first upper and lower sidebands need to be considered.

In the detection of the beam intensity (e.g. with a photodiode), the carrier combines with each sideband to produce a heterodyne beat signal at the modulation frequency. In purely frequency-modulated light, the amplitude and phase of the sidebands are precisely arranged so that the heterodyne beat signal between the carrier CAR and the upper sideband USB exactly cancels the heterodyne beat signal between the carrier CAR and the lower sideband LSB.

Since the transmission of an interferometer, as shown in FIG. 7a varies with frequency, the intensities of the transmitted sidebands depend on the offset of the carrier from the node of the interferometer. If the carrier is precisely centered at the node as in FIG. 7b, the upper and lower sidebands are transmitted with equal intensity; in the measurement of the transmitted intensity, the two heterodyne beat signals still cancel.

However, when the optical carrier frequency is not centered at the node, the transmitted sidebands have unequal intensity. Then the heterodyne beat signals in the intensity no longer cancel, and some amplitude modulation at the frequency $\nu_2$ appears in the interferometer output. This amplitude modulation is in phase with the applied frequency modulation when the upper sideband is stronger than the lower sideband, and opposite in phase otherwise.

In FIG. 7c, the optical carrier frequency is offset to a frequency above the node of the interferometer transmission, giving amplitude modulation in phase with the applied frequency modulation. In FIG. 7d, the optical carrier frequency is offset to a frequency below the node of the interferometer transmission, giving amplitude modulation opposite in phase to the applied frequency modulation.

The product of the intensity signal and a reference signal at the modulation frequency $\nu_2$ contains signals near DC which are proportional to the detuning of the carrier from the node. This product is commonly derived using some type of demodulator such as a lock-in amplifier or a mixer. The output of this demodulator versus carrier offset is shown in FIG. 7e.

Figure 5A:
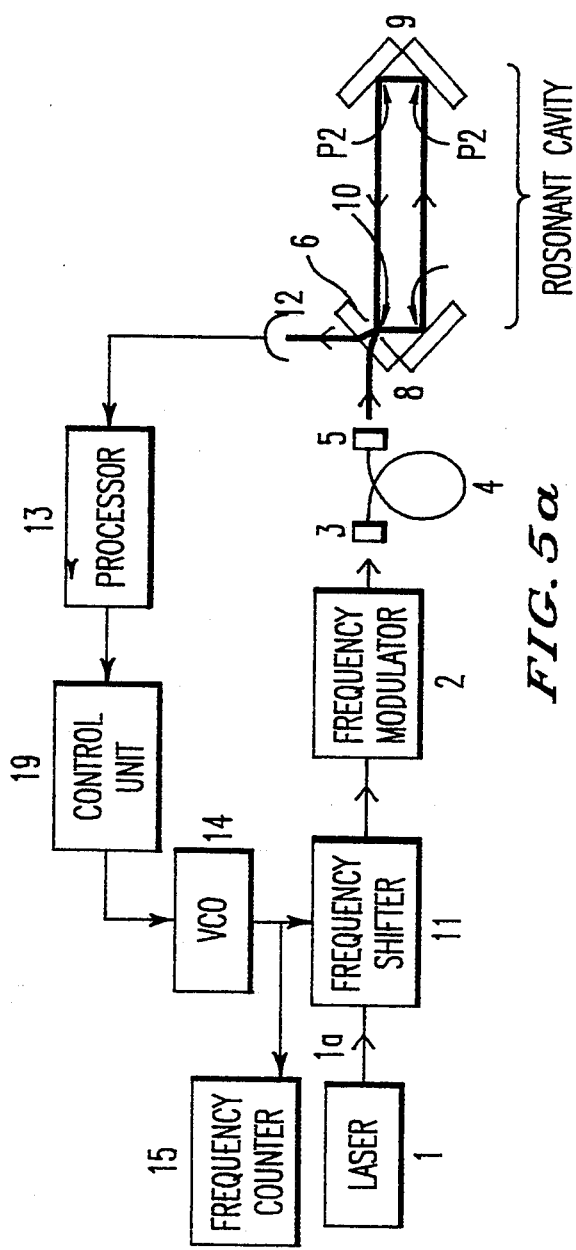
FIG. 5a shows a tracking frequency gauge with a resonant cavity interferometer of the present invention.

The interferometer may instead be a resonant interferometer as shown in FIG. 5a–5d. In these interferometers the laser beam is allowed to travel repeatedly between the reflectors. The incident light may be coupled into the path of the circulating laser beam as in FIG. 5a, using an additional partially reflecting mirror (not shown) placed in the path of one of the beams between reflectors 8 and 9; however, it is preferable to couple the light through a partially transmitting coating on one of the reflectors (the input coupler) as shown in FIG. 5a at 6. The circulating light may retrace its steps exactly after each bounce, as in FIG. 5b and 5d (a standing-wave or Fabry-Perot resonator), or it may travel around an open loop, as in FIG. 5c (a ring resonator). In most respects the operation of these interferometers is identical; each has advantages depending on the measurement geometry.

The intensity of the beam which is reflected from the input coupler of the resonator passes through a minimum when the round-trip length is an integer multiple of the wavelength, as will be explained below; there is simultaneously a maximum in the circulating intensity and in the (usually small) intensity transmitted through each of the other mirrors in the cavity. The widths of the minima in reflected intensity can be much less than the free spectral range; the widths depend only on the reflectivities and the FSR. By comparison, the Michelson interferometer response is sinusoidal; thus the widths of the minima and maxima are always one-half of the free spectral range. Within the resonator's narrower minima, the optical phase varies more rapidly with distance or wavelength than in the Michelson interferometer. Thus, the resonator has enhanced sensitivity to distance or wavelength changes.

In addition, the resonator may easily be constructed without any transmitting material in the measured distance (using front-surface mirrors, hollow dihedrals, or hollow corner cubes). A significant source of error in the Michelson interferometer is drift in the effective optical distance traveled through the glass of the beamsplitter, which supports the partially reflecting surface; this glass must appear either in the path to be measured or in the reference arm. One may attempt to compensate by adding a similar amount of glass to the other arm. Another significant source of error in the Michelson interferometer is drift in the length of the reference arm. The length of this reference arm is usually unrelated to the desired distance measurement; yet it is integral to the two-beam interferometer design, and its variations must be considered. No such reference arm appears in the resonant interferometer. The signal depends only on the ratio of the measured distance to the optical wavelength.

Figure 5D:
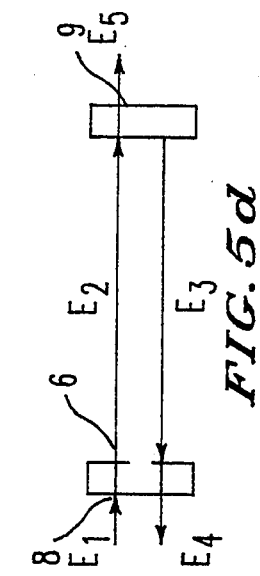
FIGS. 5b–5d show exemplary resonant cavities for a tracking frequency gauge.
Figure 5C:
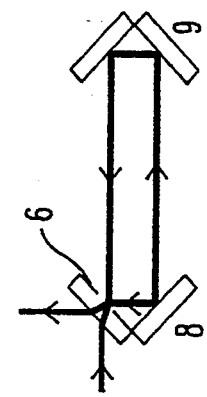
Figure 5B:
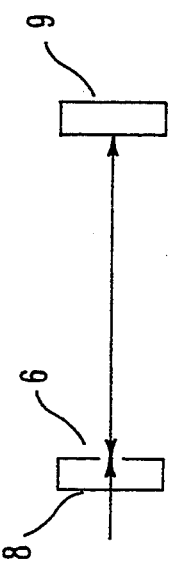

Consider the interferometer in FIG. 5d, which is similar to the interferometer in FIG. 5b; beams which would normally overlap are displaced for clarity. The beam $E_1$ from the laser source is incident on retroreflector 8 having partial reflector 6. A small portion is transmitted, giving a first contribution to the circulating beam $E_2$, and a large portion is reflected, giving a first contribution to the beam $E_4$ which is reflected from the cavity. The circulating beam $E_3$ is also incident on partial reflector 6 from the interior of the cavity; a large portion of $E_3$ is reflected from partial reflector 6, giving the second of two contributions to $E_2$. The beam $E_2$ travels to retroreflector 9, whereupon a small portion is transmitted, giving the beam $E_5$, and a large portion is reflected, giving the beam $E_3$. The beam $E_3$ travels to partial reflector 6, whereupon a small portion is transmitted, giving a second of two contributions to $E_4$; and a large portion is reflected, giving the aforementioned second contribution to $E_2$.

The intensity of the circulating beam $E_2$ is a maximum if its optical phase at reflecting surface of partial reflector 6 matches the optical phase of the beam $E_1$ at the reflecting surface of partial reflector 6; then the waves constructively interfere, giving a maximum intensity. The optical phase of the circulating beam $E_2$ depends on the length of the cavity. Let us define $\phi$ to be $$\phi = 2\pi \frac{L_{RT}}{\lambda} = 2\pi N + 2\pi \frac{\delta L}{\lambda} + 2\pi \frac{\delta \nu}{FSR} \quad \text{(Equation 6)}$$

where $L_{RT}$ is the complete round trip distance between the retroreflectors, N is an integer, $\delta L$ is an incremental distance change, $\delta \nu$ is an incremental laser frequency change, and FSR is the free spectral range, $$FSR = c/L_{RT} \quad \text{(Equation 7)}$$

Let us also define F*, called the finesse, to be $$F^* = \frac{FSR}{\pi \Delta \nu} = \frac{\lambda}{\pi \Delta L} \quad \text{(Equation 8)}$$

where $\Delta \nu$ is the width of the resonance at the half-power points for small laser frequency changes and L is the width for small distance changes. The quantity F* depends only on the reflectivities of the retroreflectors.

Then the relationship between the intensity of the transmitted beam $E_5$, the length of the cavity, and the optical wavelength is $$I_5 = \frac{I_{pk}}{1 + (2F^*)^2 \sin^2(\phi/2)} \quad \text{(Equation 9)}$$

where $I_{pk}$ is the peak intensity. This intensity reaches a maximum when $\phi = 2\pi N$ (on resonance). The intensity of the beam $E_4$ reflected from the cavity is $$I_4 = I_1 \frac{(C^*)^2 + (2F^*)^2 \sin^2(\phi/2)}{1 + (2F^*)^2 \sin^2(\phi/2)} \quad \text{(Equation 10)}$$

where C*, sometimes called the contrast of the interferometer, depends on the reflectivities of the retroreflectors. This expression reaches a minimum at $\phi = 2\pi N$ (on resonance); it must be a minimum rather than a maximum in that case because the energy from the laser is more successfully transmitted into the cavity and thence out through the other mirrors.

The detuning between the laser frequency and the interferometer resonance may be probed using the same method described above for the two-beam interferometer. In that case we observed frequency-dependent transmission of the sidebands near a minimum or maximum of transmission, which produced amplitude modulation in response to and in phase with the frequency modulation which had been imposed on the beam. The same frequency-dependent transmission of sidebands occurs with the resonant interferometer near its resonance, producing amplitude modulation on beams $E_4$ and $E_5$. The amplitude modulation visible in the intensity of either of these beams may be synchronously detected just as before, giving a signal near DC which is proportional to the detuning between the laser frequency and the resonance frequency.

Figure 2:
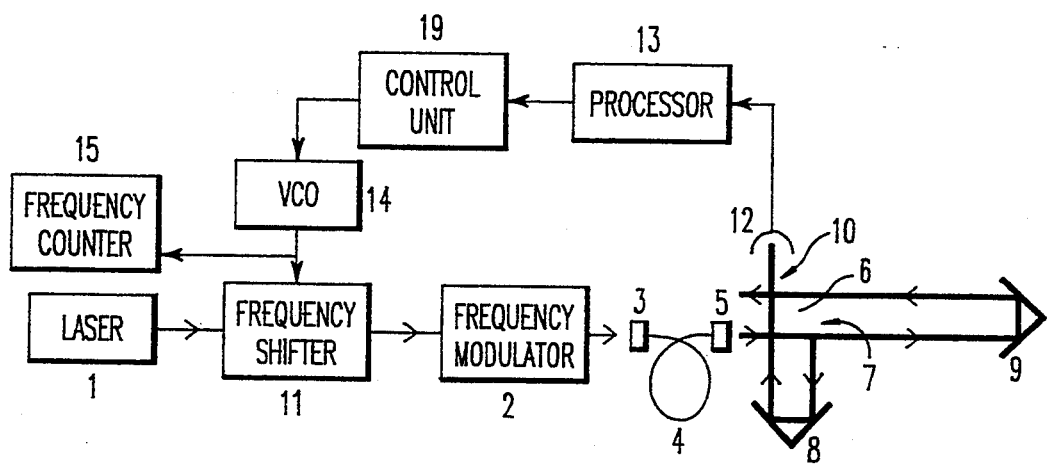
FIG. 2 shows a tracking frequency gauge (TFG) of the present invention.

FIG. 2 shows a tracking frequency gauge (TFG) in which laser 1 transmits a coherent optical beam 1a to frequency shifter 11 which varies the frequency of the optical beam and passes the beam to frequency modulator 2. Note that what is meant by a TFG is a gauge which tracks a changing length by changing a frequency to maintain a null output. The optical fiber and interferometer shown in FIG. 2 provide the same functions as those shown in FIG. 1. A signal output from the interferometer is incident upon optical detector 12.

Detector 12 is a conventional electro-optic detector. This type of detector has a cut-off frequency that is above the sideband frequency but well below the optical carrier frequency. Therefore, when the incident optical signal is only modulated in frequency, the output of this detector is a DC value. When the incident optical signal is amplitude modulated, the output of detector 12 will also have a component that varies in time according to the amplitude modulations.

Detector 12 passes an amplitude modulation signal to electronic processor 13. Electronic processor 13 functions to amplify the received signal, if necessary, filter out spectral components which are far away from the modulation frequency and demodulated the signal.

The output of electronic processor 13 is sent as the control voltage to voltage controlled oscillator (VCO) 14. VCO 14 produces an oscillation frequency corresponding to the voltage it receives from electronic processor 13. The oscillation output from VCO 14 drives frequency shifter 11. Frequency shifter 11 functions to add a frequency corresponding to the oscillation frequency from VCO 14 to the optical frequency of beam 1a. Frequency counter 15 counts the frequency of the signal provided to frequency shifter 11 by VCO 14.

The feedback from detector 12 to frequency shifter 11 is negative. Therefore the frequency variation provided to optical beam 1a tends to minimize amplitude modulations output from the interferometer. If the length L changes, the feedback loop changes the frequency in such a way as to maintain the optical carrier frequency at the same node of the interferometer transmission curve shown in FIG. 7a. Thus, the optical carrier frequency variation provided by frequency shifter 11 tracks a change in length L and frequency counter 15 provides a convenient measure of the change in L.

In both interferometers shown in FIGS. 1 and 2, one arm of the interferometer is normally kept at a fixed length and the other arm of the interferometer contains a length which may vary. The invention shown in FIG. 2 maintains the varied laser frequency at an intensity minimum of the interferometer transmission shown in FIG. 7a. As the length difference between the two arms of the interferometer changes, the negative feedback maintains the optical carrier frequency at a frequency providing destructive interference of the waves in the interferometer so that the amplitude modulation provided to detector 12 is minimized.

Thus, the instrument shown in FIG. 2 provides for variation of the optical frequency input to the interferometer so that a particular minimum of the transmission versus frequency, as shown in FIG. 7a, is tracked by the optical carrier frequency while the interferometer distance L varies. Frequency counter 15, which measures the frequency variation required to maintain the null condition, can measure frequencies to the microwave band with high accuracy, and so is a direct and extremely accurate measure of the change in length between the two arms of the interferometer.

Figure 3:
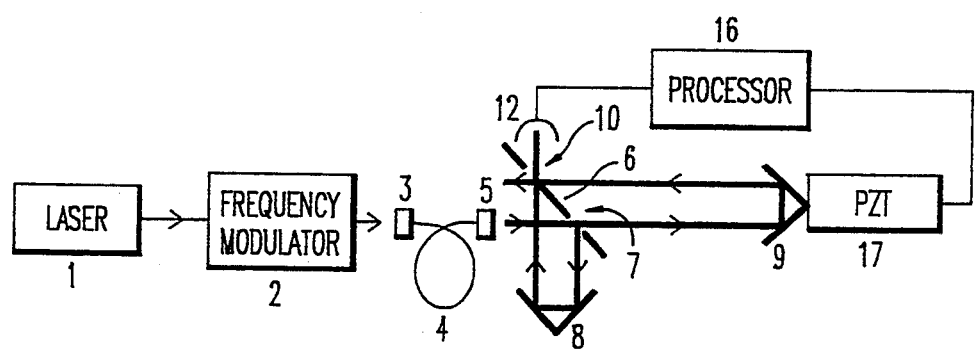
FIG. 3 shows a null gauge, and a system for maintaining a fixed distance between two points.

FIG. 3 shows another embodiment of the invention where feedback provided by the amplitude modulated signal received by detector 12 passes to electronic processor 16. Electronic processor 16 filters the modulated signal and converts it to a voltage proportional to the amplitude of the amplitude modulations. This filtering may include mixing of the signal from detector 12 with a signal at the modulation frequency. The output of electronic processor 16 drives a length transducer 17, preferably a piezoelectric transducer. Electronic processor 16 and length transducer 17 are configured so as to provide negative feedback so that an amplitude modulation signal received by detector 12 is minimized.

Thus, the system shown in FIG. 3 controls the relative length difference between the two arms of the interferometer to be constant. Length transducer 17 may be any sensitive length transducer. Preferably, length transducer 17, is a voltage controlled transducer which can be stably voltage controlled to provide length variations of one to one hundred microns, with a resolution of $10^{-12}$ meters.

Figure 4:
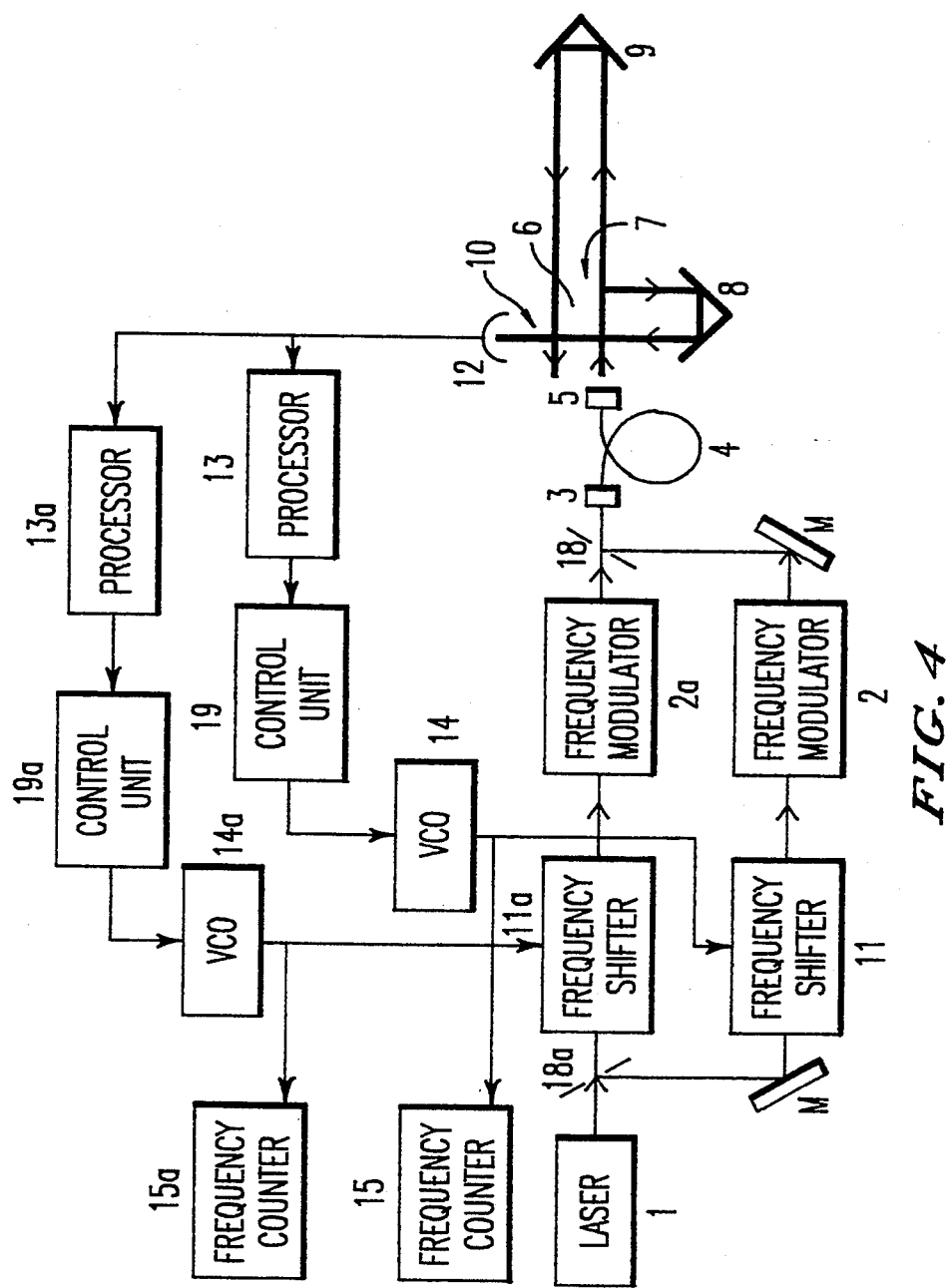
FIG. 4 shows a system for measuring an absolute distance between two points of the present invention.

FIG. 4 shows a schematic of an absolute distance gauge which uses two frequency shifters to provide two distinct optical carrier frequencies. The coherent optical beam from laser 1 is split by beam splitter 18a so that the portions thereof may acquire different frequency variations in frequency shifters 11 and 11a. The frequency varied beams are modulated by frequency modulators 2 and 2a and portions thereof are recombined by beam splitter 18. Mirrors M provide appropriate control of the directions of the laser beams.

The amplitude modulated intensity signal received by detector 12 is transmitted to electronic processors 13 and 13a which filter the signals at the modulated frequencies provided by frequency modulators 2 and 2a, respectively. Electronic processors 13 and 13a output a signal corresponding to the amplitude of the amplitude modulations at the respective optical carrier frequencies to control units 19 and 19a. Control units 19 and 19a output a voltage to VCOs 14 and 14a in order to drive frequency shifters 11 and 11a. Control units 19 and 19a allow the frequencies provided by the frequency shifters 11 and 11a to change abruptly under control of a computer or other control unit between frequencies corresponding to different orders of the interferometer.

Units 19 and 19a are necessary if the range of frequency variation which may be provided to the optical carrier frequency by frequency shifters 11 and 11a is limited. A limited frequency range implies that only a limited change in length L may be tracked by varying frequency. When the frequency variation provided by either frequency shifter 11 or 11a is near a maximum (or minimum) frequency variation that these units can provide, control units 19 or 19a change its output voltage in order to change the frequency variation provided by the corresponding shifter 11 or 11a, to correspond to a different order of the interferometer, i.e. a different node of the transmission curve shown in FIG. 7a. Control units 19 and 19a act to maintain the frequency variation within the range accessible to the frequency shifters.

Since the frequency shifters can be controlled to hop the optical frequency between spectral orders, the range of distance that may be measured is not limited by the limited frequency variation range provided by the frequency shifters 11 and 11a. Control units 19 and 19a may also provide a signal to the unit providing the final distance readout in order that it may account for hops in the tracking frequency.

FIG. 5a is another embodiment which shows a tracking frequency gauge (TFG) in which the interferometer comprises a resonant cavity. The resonant cavity shown in this embodiment comprises two retro reflectors, 8 and 9, which face one another. An optical beam enters the resonant cavity through partially reflector 6 at point 10, is transmitted to reflective point P1, reflects to point P2, reflects to point P3, and reflects back to point 10. A portion of the beam reflected to point 10 is coupled out of the cavity to detector 12. Another portion makes another transit of the optical path in the cavity. While a dihedral reflector is shown in the FIG. 5a for convenience, a corner cube reflector is generally preferred.

The resonant cavity provides advantages over a non-resonant cavity interferometric device. First, the transmission path inside the resonant cavity does not contain any solid matter. Therefore, fluctuations in the optical phase of the transmitting beam due to fluctuations in the index of refraction of solid material are avoided. Additionally, the transmission and reflection spectra of a resonant cavity contains sharp dips, as seen by the reflection spectra of a resonant cavity as a function of frequency shown in FIG. 15a. The very sharp dips provide a more accurate measure of distance when the optical carrier frequency is near on one of the dips.

FIG. 15b illustrates the fourier spectral amplitudes of a frequency modulated optical carrier signal centered at a frequency node of the cavity transmission curve in FIG. 15a.

Figure 6A:
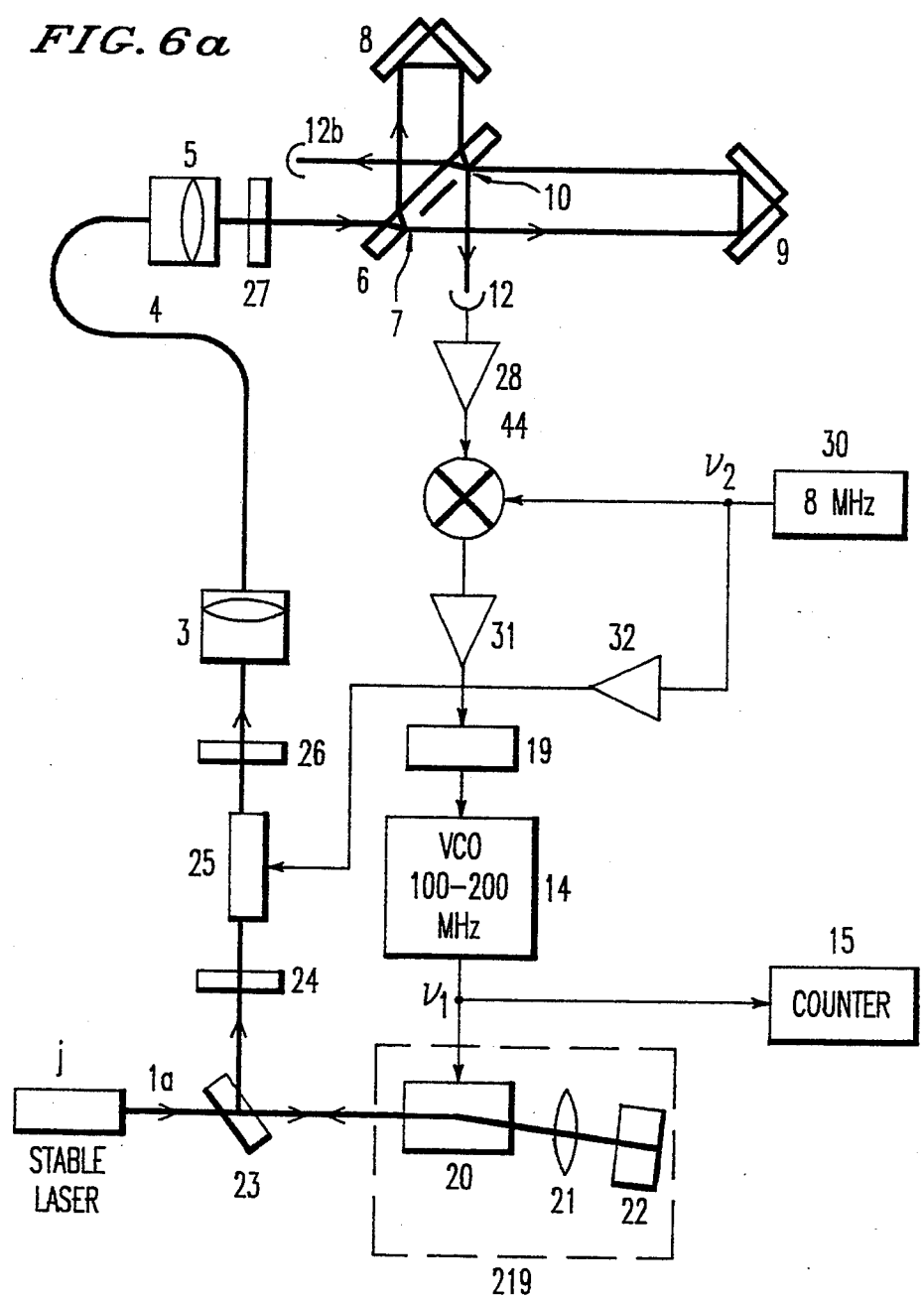
FIGS. 6a and 6b show in detail, a tracking frequency gauge of the present invention.
Figure 6B:
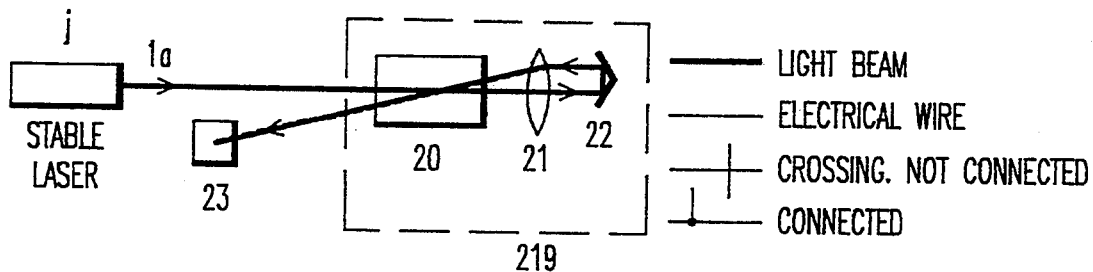

FIGS. 6a and 6b show a particular embodiment of a TFG including, in more detail, several of the features shown in FIG. 2.

FIG. 6a shows a coherent optical beam 1a output from a stabilized laser 1 transmitted into a frequency shifter 219. Frequency shifter 219 includes an acoustic-optic deflector modulator (ADM) 20, lens 21 and a dihedral mirror 22. A radio frequency is applied to ADM 20 by voltage controlled oscillator 14. The radio frequency applied to ADM 20 sets up a moving diffraction grating within the acoustic-optic cell. The diffraction grating interacts with the incident laser beam to produce diffracted beams of various orders. The beam shown exiting ADM 20 corresponds to the first order diffracted beam. ADM's may be bought commercially. The first order diffracted beam enters lens 21 and is retroreflected by retroreflector 22 back through lens 21 to reflect off mirror 23, as shown in FIG. 6b. FIG. 6b is a side view of the laser 1 and frequency shifter 219 shown in FIG. 6a. As can be seen in FIG. 6b, the beam exiting frequency shifter 219 after the second pass travels downwards with respect to beam 1a, so that at a sufficient distance from ADM 20, the beams are spatially distinct. Mirror 23 then reflects the frequency varied beam so that it passes through, consecutively, as seen in FIG. 6a, polarizer 24, phase modulator 25, polarizer 26, fiber input coupler 3, optical fiber 4, fiber coupler 5, polarizer 27 and then enters an interferometer at partial reflector 6.

In one embodiment, the phase modulator shown in FIG. 6a consists of a material such as ADP, whose index of refraction is a function of applied voltage. Periodically varying the index of refraction of the ADP crystal periodically modulates the phase of an optical beam passing through the ADP crystal. Periodic modulation of the phase provides a frequency modulation to the beam. Polarizers 24 and 26 are provided to align the polarization axis of the optical wave with a principal axis of the ADP crystal. Misalignments are corrected by polarizer 26 which removes optical intensity that does not correspond to the chosen principal axis. These polarizers help to reduce amplitude modulation which might be produced by polarization effects in the ADP.

An important point of the operation of frequency shifter 219 is that lens 21 must be positioned at a distance of its focal length from the apex of the retroreflector mirror 22 and from the center of the acoustic-optic crystal of ADM 20 for good optical alignment.

The frequency modulated and frequency varied beam passes through the interferometer and the frequency modulation is converted to an amplitude modulation as discussed earlier. The beam exits at two points and is detected by intensity detectors 12 and/or 12b. The amplitude modulated signal detected by detector 12 is passed through the amplifier 28 and into mixer 29. Amplifier 28 may also filter the signal to pass only a frequency band around the modulation frequency.

Mixer 29 mixes the amplitude modulation signal with a signal at the modulation frequency from FM drive source 30. Since the amplitude modulated signal coupled into mixer 29 has components at the drive frequency, an output with signals near DC is obtained and passed through an amplifier 31 to the input of control unit 19.

Note that the output of frequency modulation source 30 is amplified by amplifier 32 to provide sufficient voltage to provide sufficient modulation at phase modulator 25. The voltage applied to an ADP phase modulator may be several hundred volts.

As explained in the discussion of FIG. 2, feedback to ADM 20 provides a frequency variation which maintains the output of the interferometer at an intensity node thereof. This frequency variation provides an extremely accurate measure of the distance to be measured.

FIG. 7a shows, as discussed earlier, the transmission intensity through an interferometer as a function of optical frequency. FIG. 7d shows an output signal obtained by mixer 29.

Spurious signals may exist in the optical beam at the point where it enters the interferometer. The signals may include amplitude modulation at the modulation frequency due to imperfections in the frequency modulator 25. Such imperfections may include undesirable rotation of the optical beam in the frequency modulator in combination with misalignment of polarizers 24 and 26, and interferometer effects in the optical fiber resulting from partial reflection of an exiting wave back along the fiber. Spurious amplitude modulation may be effectively eliminated by a feedback loop which uses the AM signal on the optical beam, measured at a beam position which is between the frequency modulator and the interferometer, to produce compensating amplitude modulation by techniques involving either the frequency modulator or a second amplitude modulator. One example of such a feedback loop is shown in FIG. 8.

Such a feedback loop may instead use the signal exiting the interferometer at 12b. Note that the intensity output of the two ports are complementary, so that one becomes bright when the other becomes dark. This signal varies more with amplitude modulation than does the signal at 12, thus providing the basis for servo control of both amplitude modulation and distance.

Figure 8:
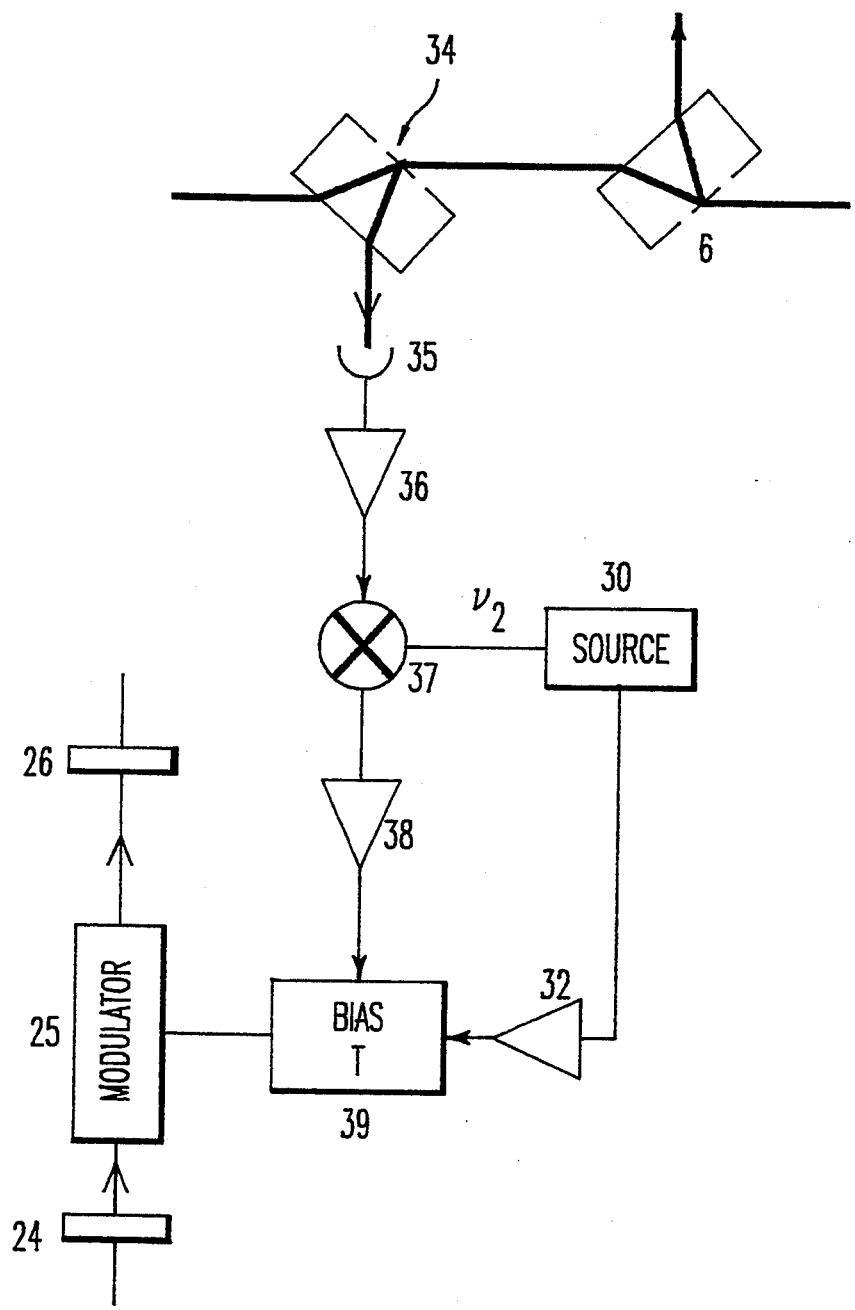
FIG. 8 shows an AM detection and control circuit of the present invention.

FIG. 8 shows a feedback loop which includes partial reflector 34 positioned between partial reflector 6 and polarizer 27 shown in FIG. 6a. Partial reflector 34 reflects part of the beam to detector 35 which detects amplitude modulations in the beam. The signal from detector 35 is amplified by amplifier 36 and mixed with a signal from the frequency modulation source in mixer 37. Since both inputs to mixer 37 are at the same frequency, the output of mixer 37 contains a signal near DC. This slowly-varying signal is input to amplifier 38 which provides a slowly-varying bias voltage to the voltage applied to frequency modulator 25, through bias T 39.

A bias T is a component which adds a DC signal to an AC signal. A bias T typically comprises a DC line with a capacitively or inductively coupled line for coupling an AC signal to the DC line, and a DC inductive choke for inhibiting the AC signal from reaching the DC source.

Bias T 39 allows the slowly-varying signal from amplifier 38 to be added to the RF signal from amplifier 32 in order to drive the phase modulator 25. In summary, the feedback loop shown in FIG. 8 adds a slowly-varying bias signal to the voltage applied to the phase modulator, producing amplitude modulation which cancels spurious amplitude modulations that are added to the laser beam elsewhere.

Figure 9A:
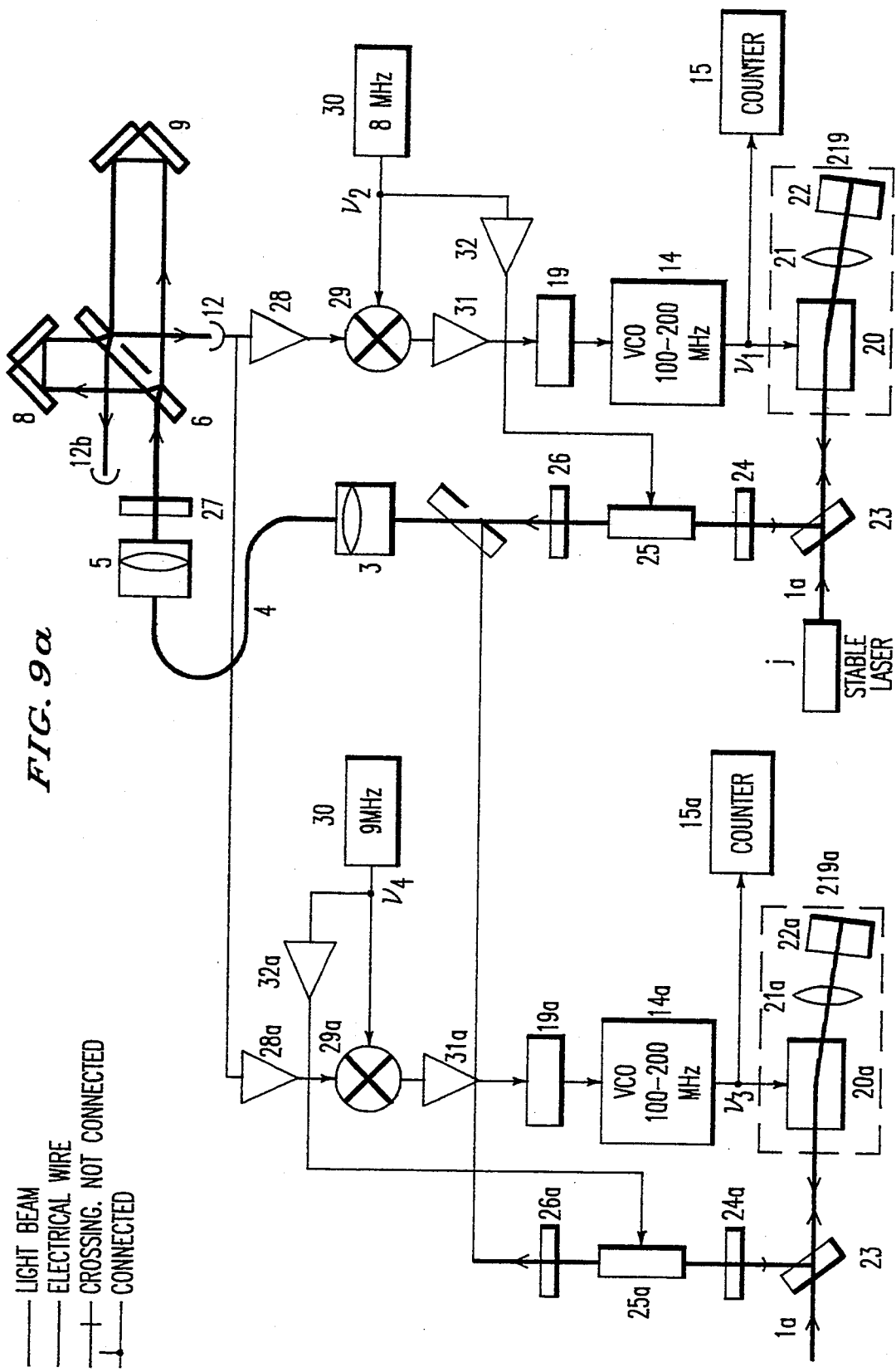
FIGS. 9a–9c show a detailed version of an absolute distance gauge of the present invention.
Figure 9C:
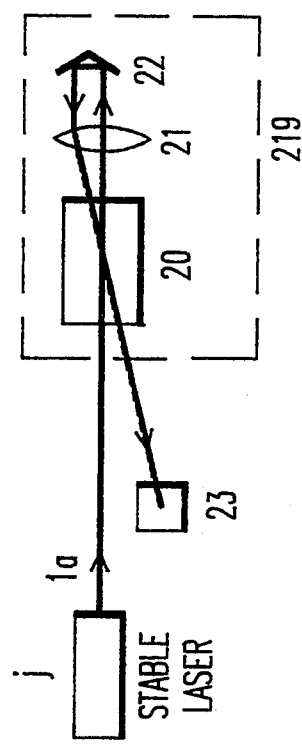
Figure 9B:
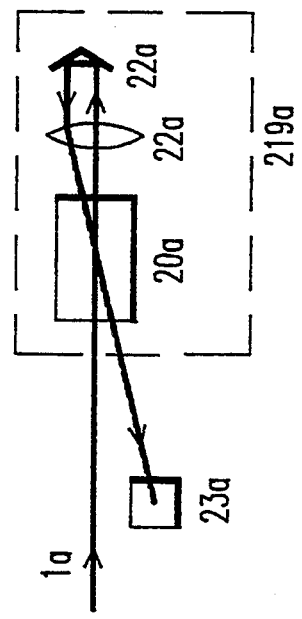

FIG. 9 is a more detailed view of an absolute distance gauge corresponding to the absolute distance gauge shown in FIG. 4. FIG. 9 shows the laser beam from stable laser 1 split into components 1a and 1b. Component 1a enters frequency shifter 219. Component 1b enters frequency shifter 219a. Frequency shifter 219a includes the ADM 20a, lens 21a and retroreflector 22a. Beam 1b exits the acoustic-optic modulator 219a and is reflected by reflector 23a to pass through polarizer 24a, phase modulator 25a and polarizer 26a. Beam 1b is then recombined with beam 1a at the partial reflector 40. The beam combined at partial reflector 40 is passed via coupler 3, fiber 4 and coupler 5 to the interferometer. Amplitude modulation signals at frequencies corresponding to both frequency modulations produced by frequency sources 30 and 30a are detected, as discussed with regard to FIG. 4.

FIGS. 10a and 10b are illustrative of the absolute distance gauge operation for the absolute distance gauge shown in FIG. 9. FIG. 10a shows transmission versus optical carrier frequency for an interferometer.

FIG. 10b shows two optical carrier frequencies corresponding to the varied optical frequencies provided by frequency shifters 219 and 219a. The two carrier frequencies are denoted CAR1 and CAR2. Side bands associated with each carrier frequency are also shown. If the number of nodes separating the two optical carrier frequencies and the frequency variations are known, then the length L may be determined through the equation:

$$\text{frequency difference} = Nc/2L \qquad (4)$$

where N is the spacing between the two frequencies, measured in nodes.

In operation, the two optical carrier frequencies may initially be identically controlled to track the same node, or different nodes. Then the signal provided by control unit 19a to VCO 14a may be increased in order to hop the corresponding optical carrier frequency to a different node, for instance exactly one node away. Then the frequency difference per unit change of N in equation 4 can be determined. Thus N can be determined. L may then be determined.

Figure 11A:
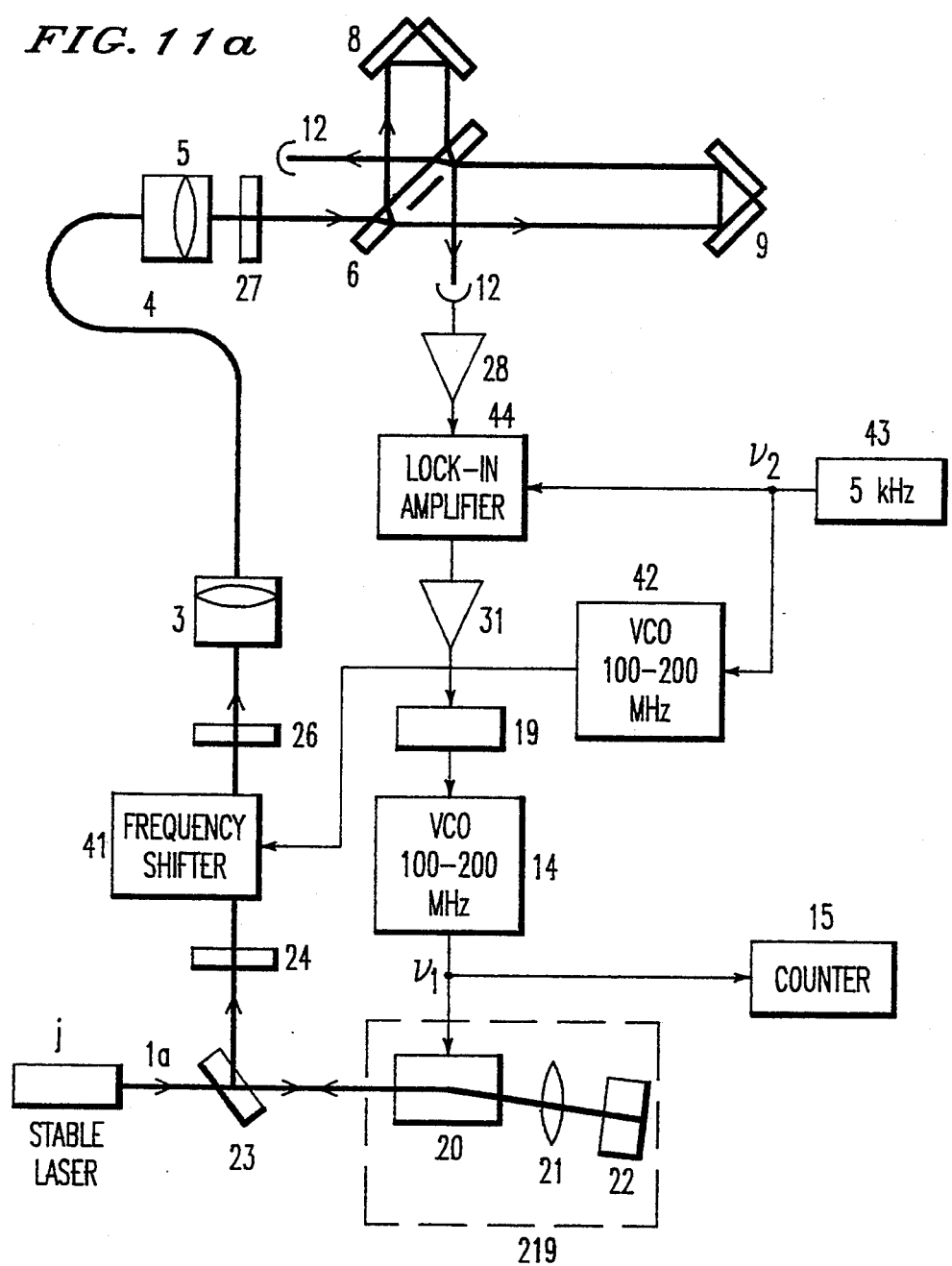
FIGS. 11a and 11b show a detailed version of an embodiment of a tracking frequency gauge of the present invention having alternating frequency modulation.
Figure 11B:
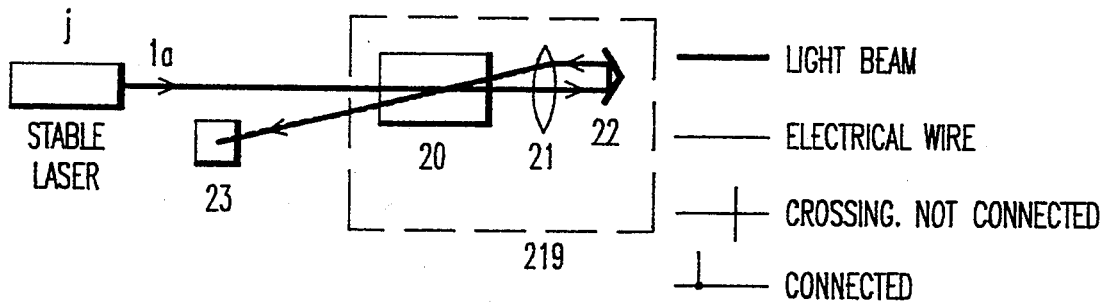

FIGS. 11a and 11b show a tracking frequency gauge which has alternating frequency modulation as opposed to sinusoidal frequency modulation. Frequency tracking is provided by frequency shifter 219 and the associated feedback loop, as discussed earlier. Frequency shifter 41 adds a frequency variation to the optical beam passing therethrough. The frequency shift is switched between at least two frequencies provided by alternating frequency source 42. The frequencies of frequency source 42 are provided to frequency shifter 41.

Switching between frequencies provided by source 42 occurs at a relatively low switching rate which is controlled by low frequency source 43. In the embodiment shown by FIGS. 11a and 11b, frequency source 43 operates at 5 kilohertz. The amplified output of the interferometer provided by amplifier 28 is input to lock-in amplifier 44. Lock-in amplifier 44 is synchronized to the output frequency of low frequency source 43. The slowly-varying output of the lock-in amplifier is amplified by amplifier 31 and is the input to the voltage controlled oscillator 14 which drives the frequency shifter 219.

In the embodiment shown in FIGS. 11a and 11b, the frequency shifter 41 plays the role of the frequency modulator 2 discussed earlier. However, the frequency shifter switches discontinuously between two discrete frequencies. Furthermore, the modulation rate can be much lower because the spacing between the two discrete frequencies can be spaced as far apart in frequency as desired, while switching at a low rate. Thus this approach allows the use of possibly less expensive low frequency detection equipment.

This approach may also allow for a less expensive instrument if the alternating frequency shift provided by 41 is instead provided by frequency shifter 219, in addition to the slowly-varying variation that frequency shifter 219 provides to track the interferometer order.

The frequency shifter 41 may consist of an ADM, lens and reflector, similar to ADM 20, lens 21 and reflector 22.

A cost savings can result if both the alternating frequency shift of frequency shifter 41 and the slow frequency variation provided by frequency shifter 219 can be provided solely by frequency shifter 219. This can be done by causing the RF signal generated by VCO 14 to alternate at a rate controlled by source 43.

Figure 11C:
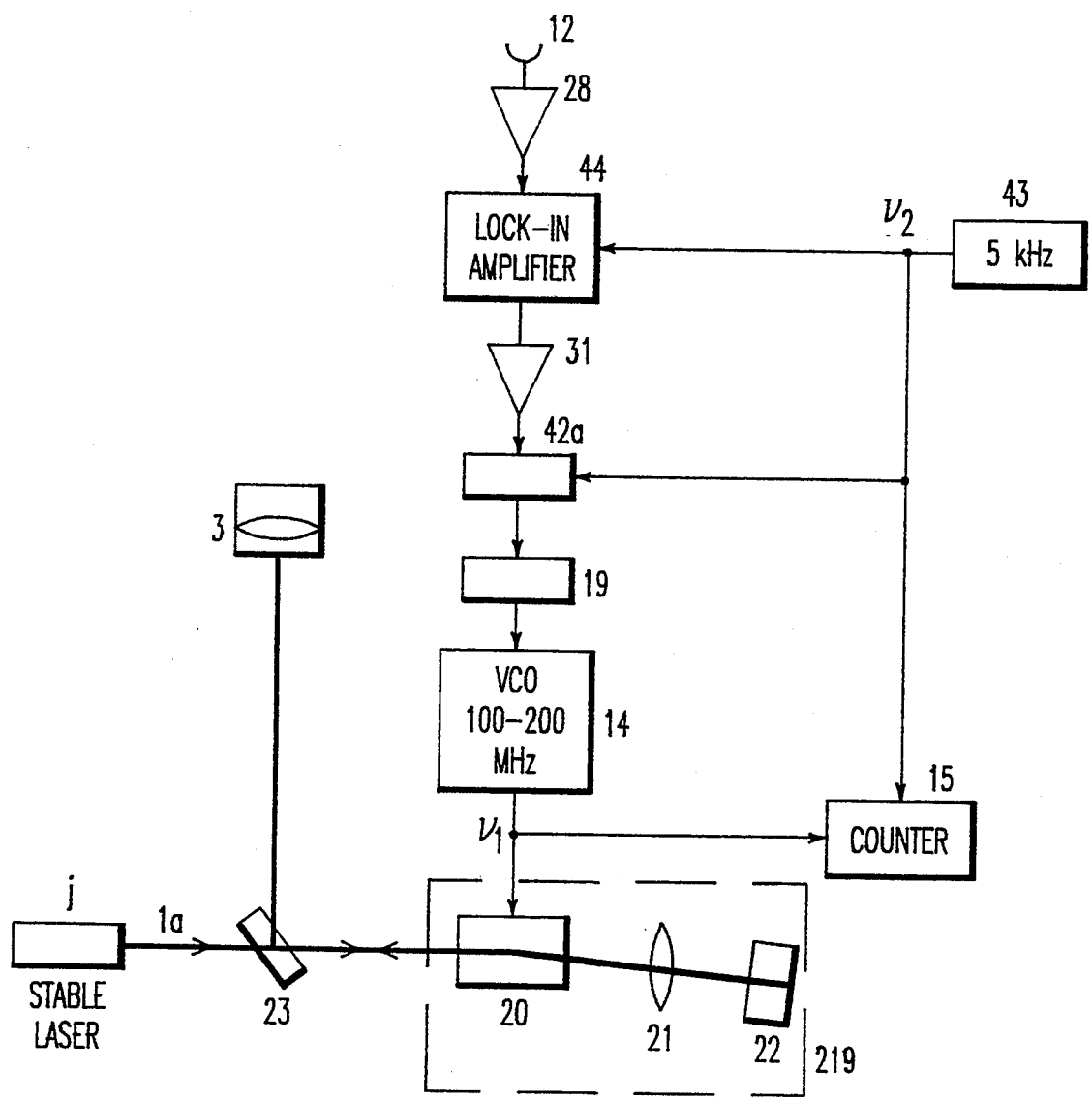
FIG. 11c shows an alternative arrangement for a tracking frequency gauge with alternating frequency modulation.

FIG. 11c shows this alternative arrangement. FIG. 11c shows a 5 Khz signal from source 43 added in an analog adder circuit 42a to the slowly varying signal from lock-in amplifier 44, and the sum of these signals is supplied through control unit 19 to VCO 14. VCO 14 generates an RF signal whose frequency has a slowly varying component and a component from source 43 that varies at 5 Khz. The 5 Khz component will allow an indicative signal to be obtained by lock-in amplifier 44 as in FIG. 11a. To prevent an erroneous readout, counter 15 uses a signal from source 43 to synchronize its readings, taking them over an integral number of cycles of the 5 Khz modulating frequency.

Another method for imparting the modulation required for a Tracking frequency Gauge is to oscillate, or "dither" the optical path in one of the interferometer arms at a dithering frequency, for instance in the audio range. For example, this could be accomplished with a piezoelectric translator attached to one reflective endpoint, or with a window whose tilt angle varied at the dither frequency. The intensity output from a representative interferometer is given by the curve in FIG. 7a, with the abscissa representing the distance travelled. With dithering, the intensity output will have an AC component at the dithering frequency, with magnitude and sign as shown in FIG. 7e, with the abscissa representing average position. A signal proportional to that in FIG. 7e could be recovered with a lock-in amplifier, replacing mixer 29 in FIG. 6a. This signal has the same form as the indicative signal recovered with the FM sideband method explained in connection with FIG. 6a, and could form the basis for servo control of the optical frequency, allowing the construction of a TFG.

The means of dithering in such a TFG may be less expensive than modulator 25, polarizers 26 and 26, and high voltage RF source 32 of FIG. 6a. An audio frequency photodetector and amplifier, and the lock-in amplifier, may be less expensive than their radio frequency counterparts employed in the TFG of FIG. 6a. Further, the audio frequency components may exhibit lower noise levels than the radio frequency components.

An absolute distance gauge can also be constructed using modulation via dithering using a hopping technique as described above (in the second paragraph beginning after Equation 12). Two optical frequencies are needed, to measure the frequencies of two interferometer orders. At any one time, only one indicative signal can be obtained via dithering, so the two frequencies must be applied alternately at a hopping frequency. The two independent values of the indicative signal during alternate half-cycles are processed to give independent signals for control of the two optical frequencies.

Figure 12:
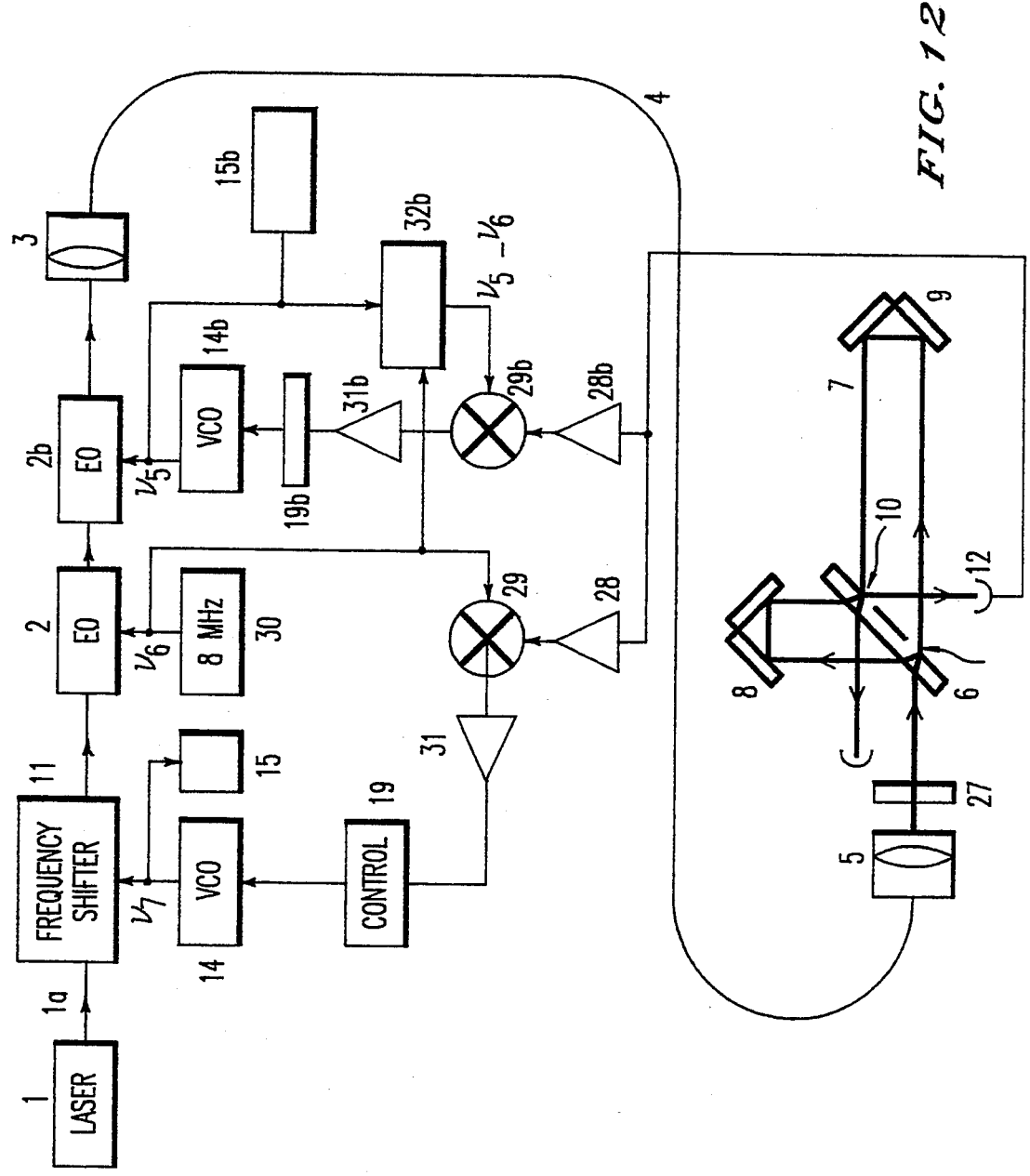
FIG. 12 shows an absolute distance gauge of the present invention having dual frequency modulation.

FIG. 12 shows an absolute distance gauge which has dual frequency modulation. This embodiment corresponds partially to the embodiment shown in FIG. 2. The relevant new features appearing in FIG. 12 include electro-optic modulator 2b which provides a second frequency modulation to the frequency modulated signal exiting frequency modulator 2, a feedback and control loop provided to control the second modulation frequency provided by electro-optic modulator 2b, and counter 15b.

The feedback and control loop includes amplifier 28b which amplifies and optionally also filters the amplitude modulated signal detected by detector 12, and mixer 29b which mixes the output of amplifier 28b with a frequency corresponding to the difference or sum frequency between the two modulation frequencies from modulators 2 and 2b.

Output of mixer 29b is provided to amplifier 31b which controls VCO 14b through control unit 19b. Counter 15b counts the change in frequency required to minimize the signal from mixer 29b. Frequency difference generator 326 provides the difference of the frequencies generated by generator 30 and VCO 14b to mixer 29b.

One means of operating the absolute distance gauge shown in FIG. 12 is to provide a modulation frequency to frequency modulator 2b equal to an integer multiple the FSR so that sidebands produced by modulator 2b are separated in frequency from the optical carrier frequency by an integral number of optical orders, as shown by the distinct triplets 331, 332 and 333 in FIG. 13b. Note that the center frequency of each triplet is centered at a transmission intensity node shown in FIG. 13a. Each center frequency of the triplets shown in FIG. 13b has sidebands 334, 335 corresponding to a frequency modulation provided by electro-optic modulator 2 shown in FIG. 12.

The frequency modulation imparted by electro-optic modulator 2 in FIG. 12 functions to maintain triplet 331 at a node by controlling the voltage input to voltage controlled oscillator 14, as discussed earlier. Control unit 19b allows the optical frequency to hop by an integral number of optical orders of the interferometer. By shifting the modulation frequency $\nu_5$ so that the optical carrier side bands 333 and 332 shift by one integral optical order, the absolute length of the interferometer may be determined through equation 4, as discussed earlier.

Figure 14:
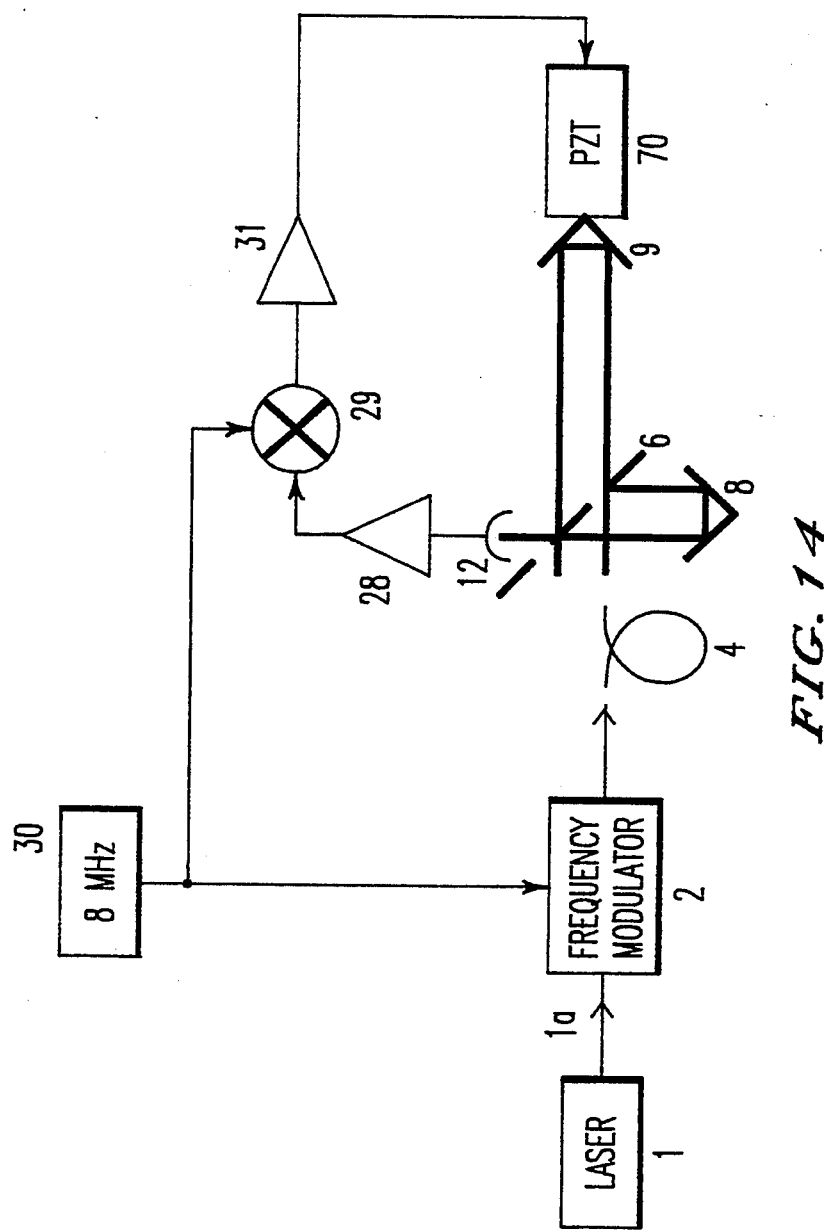
FIG. 14 shows an FM side band locking null gauge of the present invention.

FIG. 14 shows a laser interferometer system used to maintain the difference in distances in the two arms of the interferometer at a fixed value by minimizing an amplitude modulation produced therefrom in a feedback loop controlling a length transducer attached to one of the interferometer arms. In this system the output of mixer 29 is provided to amplifier 31 and then fed to length transducer 70 attached to retroreflector 9 of the interferometer.

As discussed earlier, FIG. 15a shows, as a function of frequency, the intensity of a signal reflected from an optical cavity resonator. In an optical cavity, the resonances may be much sharper than the transmission or reflection resonances which occur in a single pass interferometer. Therefore, the amplitude modulation signals produced thereby due to frequency modulation of an input beam input into an interferometer, as discussed earlier, are enhanced. FIG. 15b shows fourier components of a frequency modulated beam input into such a cavity resonator.

Figure 16A:
FIGS. 16a–16d show exemplary resonant cavities of a resonant cavity interferometer of the present invention.
Figure 16B:
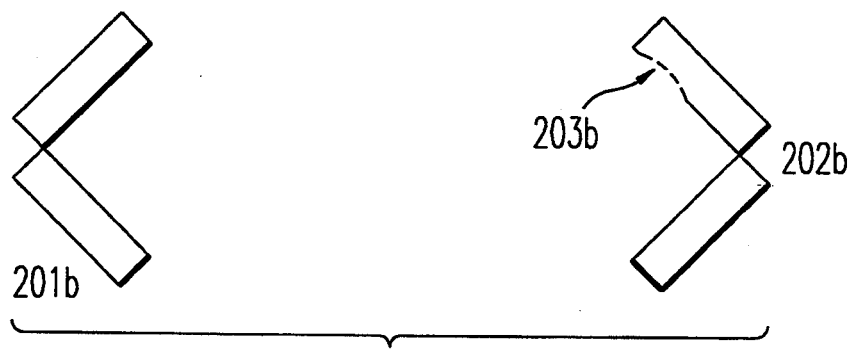

Many different configurations or optical cavity resonators are possible. (Also, many different configurations of Michelson and Mach-Zhender interferometers exist.) Two-dimensional representations of four such optical resonant cavities are shown in FIGS. 16a, 16b and 16c and 16d. FIG. 16a shows two opposed dihedral or corner cube retroreflectors 201 and 202. Retroreflector 202 has a semireflective surface 203 for coupling in an optical beam. FIG. 16b shows a dihedral or corner cube retroreflector 201a coupled to a flat reflector 202a in which a portion 203a of the surface of 202a facing reflector 201a is semireflective for coupling to an optical beam.

Figure 16C:
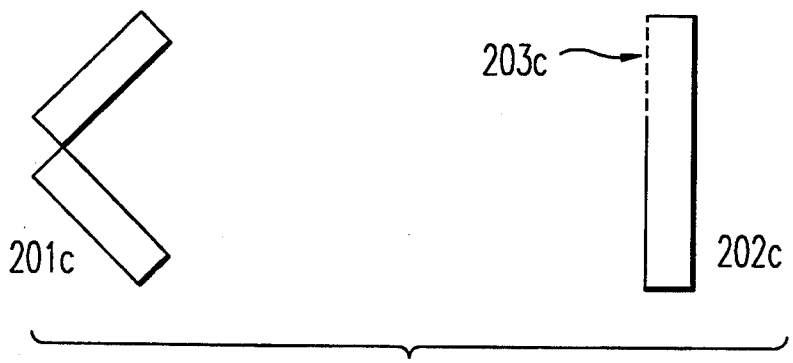
Figure 16D:
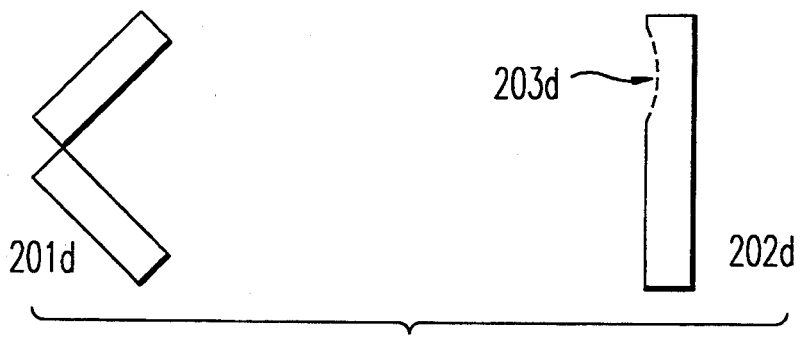

FIG. 16c shows a dihedral or corner cube retroreflector 201b coupled to a flat reflector 202b which also has a concave reflective surface 203b for coupling to an optical beam. The cavity shown in FIG. 16c provides a stable resonant cavity and is therefore preferable. FIG. 16d shows a dihedral or corner cube retroreflector 201d coupled to a reflector 202d with a curved portion 203d. The choice of which type of geometry to use for a resonant cavity or for arms of a two-beam interferometer of the invention depends upon what type of vibrations are expected to occur. Clearly, concave portions and semireflective portions need not be on the same mirror.

Figure 17A:
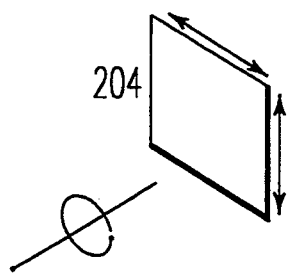
FIG. 17a–17c show reflective elements of a resonant cavity of the present invention and symmetry operations which may be performed thereon.
Figure 17B:
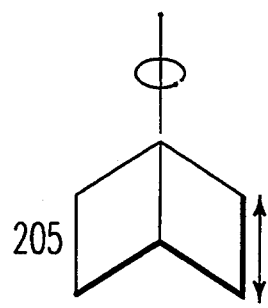
Figure 17C:
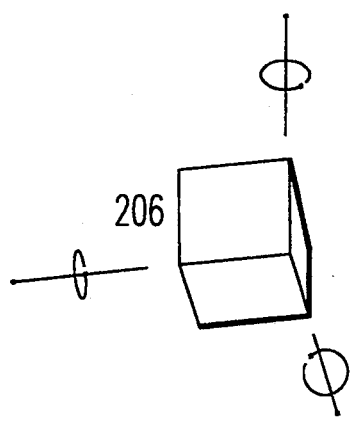

The effect of vibrations may be minimized by providing a cavity and/or interferometer which is insensitive to the type of vibration expected. Examples of this are shown in FIGS. 17a, 17b and 17c. FIG. 17a indicates that a plane reflective surface can be rotated about the plane or translated in either direction of the plane without affecting a cavity length including such a reflective surface.

FIG. 17b indicates that a dihedral reflective mirror element 205 may be rotated about the axis of its joint or translated vertically along that axis without affecting the length of a cavity of which it is apart. FIG. 17c shows that a corner cube retroreflector 206 may be rotated about any one of its principal axes without affecting the length of a cavity in which it forms one end.

Beams travelling in optical fibers typically experience reflections at each end. Because of these internal reflections, the fiber behaves like a resonant cavity in which the mirror reflectivities are small. This is undesirable in that frequency modulated light is modified during its passage through the fiber, emerging with a small amount of amplitude modulation. This amplitude modulation is produced in the same way that was described in the discussion of the resonant interferometer.

Because the index of refraction of the glass in the fiber is sensitive to its temperature, the frequencies of the interferometric nodes of the transmission of the fiber sweep back and forth as the temperature varies; as the nodes sweep across the carrier and sidebands of the frequency-modulated laser beam, the strength and sign of the spurious amplitude modulation vary rapidly. In the distance-measuring interferometers we have discussed, the amplitude modulation is expected to represent the detuning from a node of the interferometer. The small varying amount of amplitude modulation produced by the fiber then produces a varying error in such measurements. These errors may be minimized by providing couplings at each end of the fiber which minimize the internal reflections at the ends.

The usual method of ending a fiber is a cleave or polish leaving a face perpendicular to the fiber axis. This square cleave disadvantageously reflects a large amount of laser light back through the fiber (several percent, depending on the technique). A common approach for reducing reflectivity is to cleave or polish the exit face at an angle, so that most of the light reflected from this face fails to undergo total internal reflection within the core, and escapes. The reflected light couples poorly to the propagating mode of the fiber.

However, this approach disadvantageously distorts the emerging beam, which may lead to systematic errors in the distance gauge. This distortion occurs because the beam emerges with a large angular spread from a surface which is not perpendicular to the central direction of the spreading beam. The deflection of the emerging rays by refraction at the surface is a nonlinear function of the ray's angle of incidence; thus the rays which are travelling more nearly perpendicular to the exit face are deflected less than the rays which are travelling more nearly parallel to the exit face.

Figure 18A:
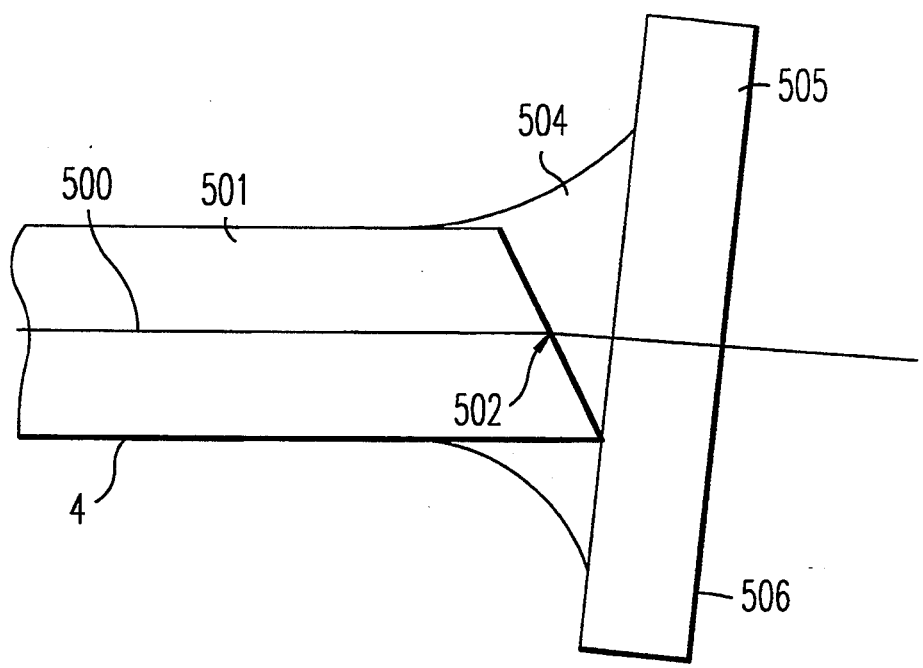
FIGS. 18a and 18b show systems for terminating an optical fiber, and launching a low-distortion beam into free space, with greatly reduced reflection back along the fiber.
Figure 18B:
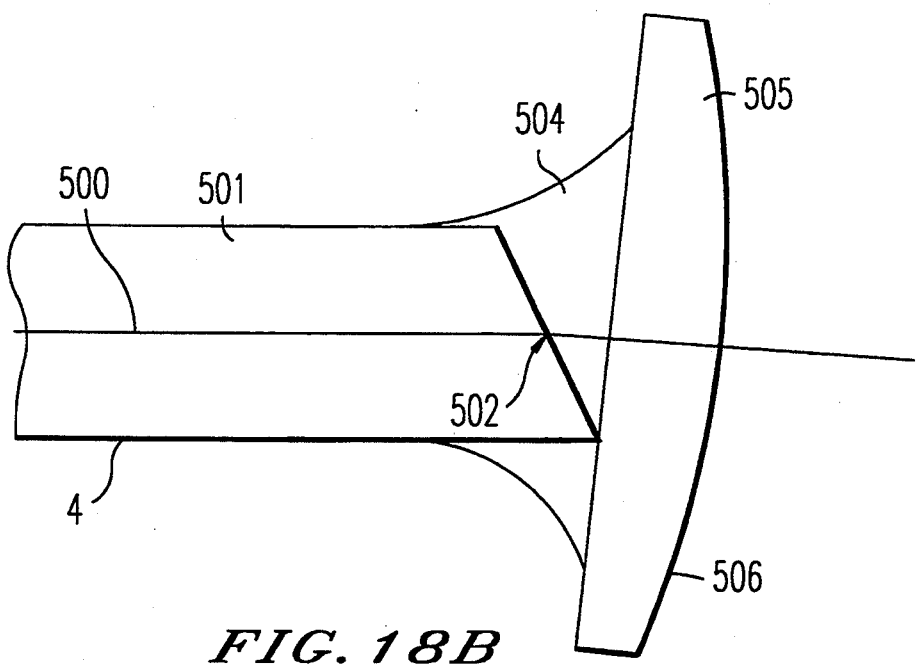
Figure 19:
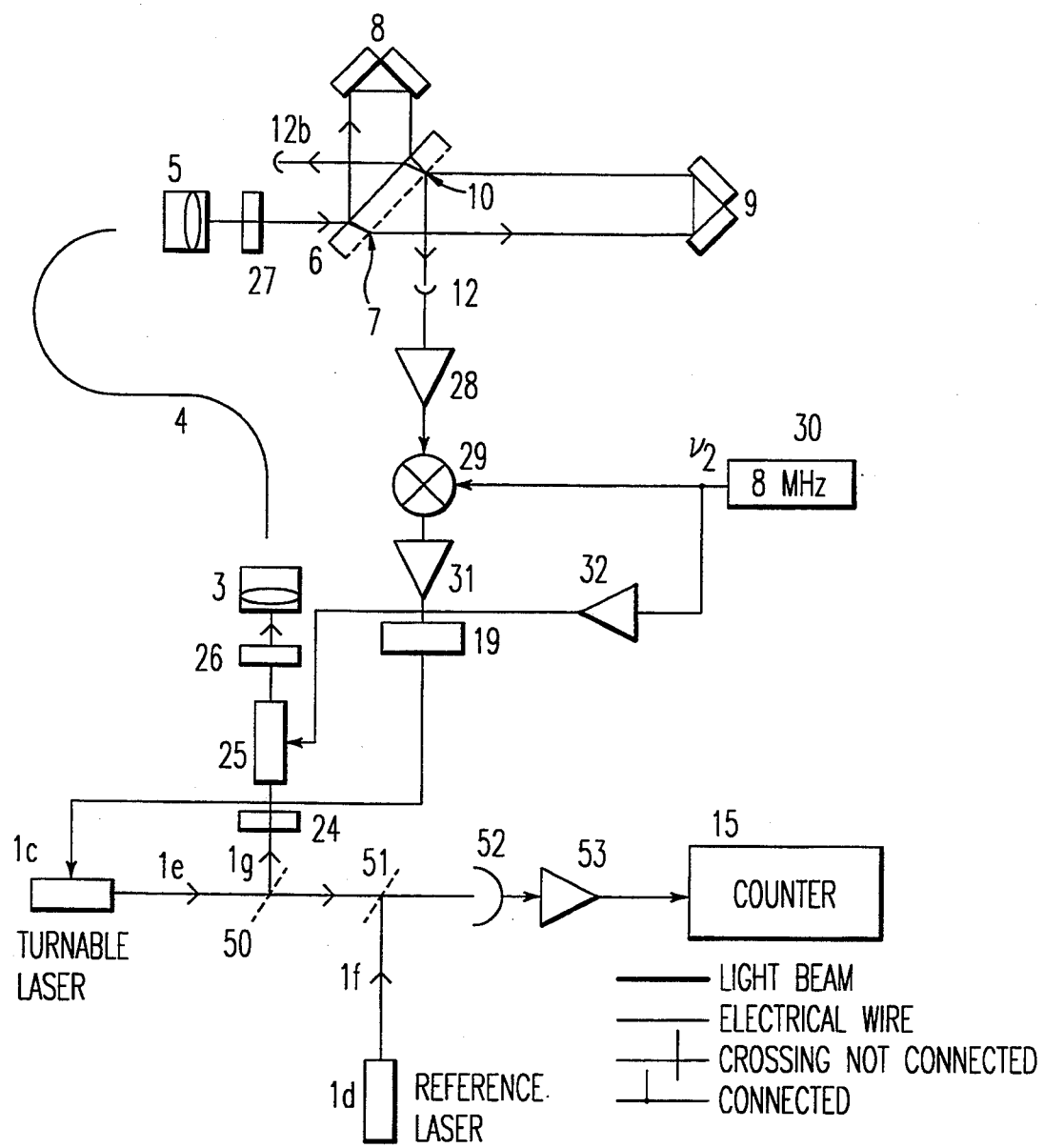
FIG. 19 shows another laser gauge system of the invention.

FIGS. 18a and 18b show coupling schemes which reduce distortion yet provide low reflectivity of the bare angled exit face. The light travels through the fiber core 500, which is surrounded by a glass cladding 501. This cladding provides mechanical strength, and because its index of refraction is different from that of the core, it participates in containing the light inside the core by total internal reflection; but because its attenuation is high, it does not typically carry much of the light. The exit face 502 of the fiber core is nearly perpendicular to the axis of the fiber, but is tilted slightly so that remaining reflections at this face are still poorly coupled back into the fiber. The beam 503 emerging from the fiber core diverges due to ordinary diffraction, and so it expands as it traverses index matching optical cement 504 and the glass in the cap 505; some of this light reflects from the far surface 506 of the cap and returns toward the fiber end 502 as it continues to expand. This expansion reduces the intensity of the returning light at the fiber end 502 and so reduces the amount of light coupled back into the fiber core 500. The far surface 506 may also be given a special coating to reduce its reflectivity (antireflection coating). Far surface 506 must be well polished to minimize the wide-angle scattering of light by imperfections. The overall intensity coupled back into the fiber core is expected to decline in proportion to the square of the distance from the fiber exit face 502 to the far surface 506.

The cap 505 and far surface 506 also may be tilted with respect to the optical axis so that the returning beam is also displaced from the fiber core at the end 502; more of the returning light enters the cladding 501 instead of the core 500, further reducing the amount of light coupled back into the fiber core 500.

The overall intensity coupled back into the fiber core is expected to decline in proportion to the antilogarithm of the negative of the square of the tilt angle (following a Gaussian function). If the far surface 506 is flat, the divergence of the beam limits the improvement that may be gained from such a tilt. Calculations show that the overall reflected intensity may be 40% more sensitive to this tilt than to an equal tilt of the fiber exit face 502 (by a conventional angled cleave or polish, in which the cap 505 and cement 504 are absent).

The benefit of a tilt of far surface 506 may be increased if far surface 506 of the cap is curved, as shown in FIG. 18b, in which case the spreading of the beam may be reduced or even reversed. When the beam returns to the fiber end 502, its smaller size allows it to be much better separated from the fiber core by a small tilt. A curvature of this surface also helps by reducing the angular spread and spherical aberration of the beam, which may allow any later optics to be simpler.

Cap 505 may have a width that is larger than the expanded beam exiting the cap, an index of refraction that is very close to the index of refraction of the optical cement 504 and of the optical fiber, and a flat or curved but in either case smooth far surface 506 through which the beam exits.

Obviously, numerous additional modification and variations of the present invention are possible in light of the above teachings. In particular, as mentioned earlier the optical beam may be replaced by any coherent electromagnetic beam. Similarly, the other components such as frequency modulators and shifters and beam guiding components which have well known analogs at suboptical (infrared, millimeter wave, microwave and radio wave) frequency ranges of the spectrum may be employed. It is envisioned that lower frequencies may be practical for very long baseline interferometers. It is therefore to be understood that within the scope of the appended claims the invention may be practiced otherwise than as specifically described herein.

What is claimed as new and desired to be secured by Letters Patent of the United States is:

1. A system for measuring a distance between two points, which comprises:

means for generating a coherent electromagnetic first beam having a first frequency which can be varied within a frequency range;

an interferometer coupled to said first beam and comprising plural reflective surfaces including first and second reflective surfaces separated by said distance, said interferometer providing an optical output signal which is a sum of coherent electromagnetic beams that travel different path lengths in said interferometer; and first feedback means for producing a first feedback signal based on said optical output signal, and feeding back said first feedback signal to said means for generating to control the frequency of said first beam so as to maintain constant at at least one value an optical phase difference between at least two of said different path lengths.

2. A system according to claim 1, wherein said means for generating comprises:
an acousto-optic modulator.

3. A system according to claim 1, wherein said means for generating comprises:
a source which generates said first beam; and
means, coupled to said source, for varying said first frequency of said first beam generated by said source.

4. A system according to claim 1, wherein said means for generating comprises:
at least one of a magneto-optic modulator and an electro-optic modulator.

5. A system according to claim 1, which further comprises:
first means for frequency modulating said first beam at a first modulation frequency.

6. A system according to claim 5, wherein said first means for frequency modulating comprises:
an electro-optic modulator.

7. A system according to claim 5, wherein:
said means for generating comprises a source of said first beam; and
said first means for frequency modulating comprises one of an acousto-optic modulator, a magneto-optic modulator, and a means, applied to said source, for modulating said first frequency of said first beam generated by said source.

8. A system according to claim 5, which further comprises:
first frequency variation control means for controlling said means for generating to produce said first frequency; and
wherein said first feedback means further comprises means for detecting a first amplitude modulation at said first modulation frequency, of said optical output signal from said interferometer, and feeding back, as negative feedback, a feedback signal corresponding to an amplitude value of said first amplitude modulation, to said first frequency control means, thereby maintaining a minimum first amplitude modulation.

9. A system according to claim 8, which further comprises:
a second means for frequency modulating said first beam with a second modulation frequency.

10. A system according to claim 9, which further comprises:
means for detecting a second amplitude modulation of said optical output signal at one of the sum and difference of said first and second modulation frequencies;
second modulation frequency control means for controlling said second modulation frequency; and
second feedback means for feeding back a second feedback signal corresponding to an amplitude of said second amplitude modulation, as negative feedback, to said second frequency modulation control means.

11. A system according to claim 10, wherein:
said second modulation frequency control means comprises auxiliary control means for controlling a second switch means and for selectively changing said second modulation frequency to first and second frequencies which correspond to different optical orders of said interferometer, said second switch means for connecting and disconnecting said second feedback signal to the second means for frequency modulating.

12. A system according to claim 8, further comprising:
said first beam comprising first and second portions;
second means for varying frequency of the second portion which provides said second portion with a second frequency;
monitor means for monitoring variations in frequency of the first and second portions;
second means for frequency modulating said second portion; and
means for detecting a second amplitude modulation at said second modulation frequency.

13. A system according to claim 12, which further comprises:
second frequency variation control means for controlling said second means for varying frequency to produce said second frequency;
second feedback means for feeding back a signal corresponding to the amplitude of said second amplitude modulation, as negative feedback, to said second frequency variation control means, thereby minimizing said second amplitude modulation.

14. A system according to claim 13, wherein:
the first frequency variation control means further comprises a first switch means for connecting and disconnecting said first feedback signal to said means for generating, and first auxiliary control means for controlling said first switch means; and
the second frequency variation control means further comprises a second switch means for connecting and disconnecting said second feedback signal to said second means for varying frequency, and second auxiliary control means for controlling said second switch means, whereby the first and second frequencies may be varied to correspond to different optical orders of the interferometer.

15. A system according to claim 1, wherein:
said feedback means comprises detection means for detecting an amplitude modulation of said optical output signal from said interferometer; and
control means, coupled to said detection means and to said means for generating, for controlling said first frequency so that the intensity of said optical output signal remains constant.

16. A system according to claim 1, which further comprises:
monitor means for monitoring a variation in said first frequency, wherein said variation in frequency corresponds to a change in said distance.

17. A system according to claim 1, wherein the reflective surfaces of the interferometer are arranged to form a multiple pass resonant cavity.

18. A system according to claim 1, which further comprises:
means for periodically translating one of said reflective surfaces at a dither frequency.

19. A system according to claim 18, which further comprises:
first frequency variation control means for controlling said means for generating to produce said first frequency having a first value; and
wherein said first feedback means further comprises means for detecting a first amplitude modulation at said dither frequency, of said optical output signal from said interferometer, and feeding back, as negative feedback, a feedback signal corresponding to an amplitude value of said first amplitude modulation, to said first frequency control means, thereby maintaining a minimum first amplitude modulation.

20. A system according to claim 19, which further comprises:

second frequency variation control means for controlling said means for generating to produce said first frequency having a second value;

wherein said first and second frequency variation control means control the frequency of said first beam during first and second half-cycles, respectively, of said hopping frequency, giving it said first and second values;

wherein said first and second frequency variation control means control the frequency of said first beam during first and second half-cycles, respectively, of said hopping frequency, giving it said first and second values;

wherein said first amplitude modulation refers to the amplitude modulation present during said first half-cycle;

further comprising second feedback means for detecting a second amplitude modulation of said optical output signal from said interferometer at said dither frequency, during said second half-cycle, and feeding back, as negative feedback, a feedback signal corresponding to an amplitude value of said second amplitude modulation, to said second frequency control means, thereby maintaining a minimum second amplitude modulation; and monitor means for monitoring variations in frequency during said first and second half-cycles.

21. A system according to claim 20, wherein:

the first frequency variation control means further comprises a first switch means for connecting and disconnecting said first feedback signal to said means for generating, and first auxiliary control means for controlling said first switch means; and the second frequency variation control means further comprises a second switch means for connecting and disconnecting said second feedback signal to said second means for varying frequency, and second auxiliary control means for controlling said second switch means, whereby said first and second values of said first frequency may be varied to correspond to different optical orders of the interferometer.

22. A system according to claim 1, further comprising:

transducer means, coupled to said interferometer and said first feedback means, for controlling said distance.

23. A system for measuring a distance between two points, which comprises:

an interferometer comprising plural reflective surfaces arranged to form a resonant cavity, wherein the distance to be measured is the distance between two of said plural reflective surfaces;

a coherent electromagnetic beam coupled to said interferometer;

means for varying a frequency of said coherent electromagnetic beam; and means for frequency modulating said coherent electromagnetic beam.

24. A system according to claim 23, wherein:

one or more of said plural reflective surfaces of said resonant cavity are partially transparent.

25. A system according to claim 23, wherein one of said plural reflective surfaces of the resonant cavity comprises a flat portion and a concave portion.

26. An interferometer for a system for measuring distance between two points, comprising:

plural reflective surfaces arranged to form a resonant cavity, wherein the distance to be measured is the distance between two of said plural reflective surfaces, and wherein one of said reflective surfaces comprises a flat portion and a concave portion.

27. A system according to claim 26, wherein:

one or more of said plural reflective surfaces of said resonant cavity are partially transparent.

28. A process for measuring a distance between two points, comprising the steps of:

generating a coherent electromagnetic first beam having a first frequency with a generator means;

varying the first frequency within a frequency range;

coupling said first beam to an interferometer having plural reflective surfaces including first and second reflective surfaces separated by said distance, said interferometer providing an optical output signal which is a sum of coherent electromagnetic beams that travel different path lengths in said interferometer; and producing a first feedback signal based on said optical output signal;

feeding back said first feedback signal to said generator means to control the frequency of said first beam so as to maintain an optical phase difference between at least two of said different path lengths constant at at least one value.

* * * * *